(12) United States Patent
Dooley et al.

(10) Patent No.: US 9,481,143 B2
(45) Date of Patent: Nov. 1, 2016

(54) MULTILAYER STRUCTURES HAVING ANNULAR PROFILES

(71) Applicant: Dow Global Technologies LLC, Midland, MI (US)

(72) Inventors: Joseph Dooley, Midland, MI (US); Jeffrey M. Robacki, Freeland, MI (US); Mark A. Barger, Midland, MI (US); Robert E. Wrisley, Clare, MI (US); Sam L. Crabtree, Midland, MI (US); Calvin L. Pavlicek, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 348 days.

(21) Appl. No.: 14/057,717

(22) Filed: Oct. 18, 2013

(65) Prior Publication Data

US 2014/0044906 A1   Feb. 13, 2014

Related U.S. Application Data

(62) Division of application No. 12/706,323, filed on Feb. 16, 2010, now Pat. No. 8,562,885.

(60) Provisional application No. 61/154,392, filed on Feb. 21, 2009.

(51) Int. Cl.
   B32B 1/08     (2006.01)
   B29C 47/00   (2006.01)
   (Continued)

(52) U.S. Cl.
   CPC ............ B32B 1/08 (2013.01); B29C 47/0023 (2013.01); B29C 47/061 (2013.01);
   (Continued)

(58) Field of Classification Search
   None
   See application file for complete search history.

(56) References Cited

U.S. PATENT DOCUMENTS

| | | |
|---|---|---|
| 3,288,317 A | 11/1966 | Wiley |
| 3,557,265 A | 1/1971 | Chisholm et al. |

(Continued)

FOREIGN PATENT DOCUMENTS

| | | |
|---|---|---|
| EP | 0255043 | 3/1988 |
| JP | 1-153920 A1 | 10/1989 |

(Continued)

OTHER PUBLICATIONS

Japanese Office Action relating to Japanese Patent Application No. 2011-551232, dated Jan. 24, 2014.

(Continued)

*Primary Examiner* — David Sample
*Assistant Examiner* — Donald M Flores, Jr.
(74) *Attorney, Agent, or Firm* — Dinsmore & Shohl LLP

(57) ABSTRACT

Disclosed are multilayer film structures having annular profiles, and methods and apparatus of making the structures disclosed. The annular multilayer articles have a uniform thickness, at least four layers and comprise overlapped and non-overlapped circumferential areas; wherein the layer structure of the non-overlapped area is doubled in the overlapped layer. A method of making the structure includes providing a multilayer flow stream with at least four layers of thermoplastic resinous materials; feeding the multilayer flow stream to a distribution manifold of an annular die to form an annular multilayer flow stream; and removing the annular multilayer flow stream from the annular die to form the annular multilayer structure. Also disclosed is an apparatus, comprising: a feedblock, with optional layer multiplier, that provides a multilayer flow stream of at least four layers to the manifold of an annular die; and an annular die having at least one distribution manifold that extrudes a multilayer flow stream.

20 Claims, 6 Drawing Sheets

(51) Int. Cl.
| | |
|---|---|
| B29C 47/06 | (2006.01) |
| B29C 47/26 | (2006.01) |
| B29C 47/70 | (2006.01) |
| B29C 55/28 | (2006.01) |
| B32B 37/00 | (2006.01) |
| B29C 47/56 | (2006.01) |
| B32B 5/18 | (2006.01) |
| B32B 5/22 | (2006.01) |
| B32B 5/32 | (2006.01) |
| B32B 27/06 | (2006.01) |
| B32B 27/08 | (2006.01) |
| B32B 27/18 | (2006.01) |
| B32B 27/20 | (2006.01) |
| B32B 27/30 | (2006.01) |
| B32B 27/32 | (2006.01) |
| B32B 27/34 | (2006.01) |
| B32B 27/36 | (2006.01) |
| B32B 27/40 | (2006.01) |
| B32B 3/06 | (2006.01) |
| B32B 3/26 | (2006.01) |
| B32B 3/28 | (2006.01) |
| B29C 47/28 | (2006.01) |
| B29C 49/04 | (2006.01) |
| B29C 49/22 | (2006.01) |
| B29L 23/00 | (2006.01) |
| B32B 37/15 | (2006.01) |

(52) U.S. Cl.
CPC .......... *B29C 47/065* (2013.01); *B29C 47/26* (2013.01); *B29C 47/263* (2013.01); *B29C 47/56* (2013.01); *B29C 47/707* (2013.01); *B29C 55/28* (2013.01); *B32B 3/06* (2013.01); *B32B 3/263* (2013.01); *B32B 3/28* (2013.01); *B32B 5/18* (2013.01); *B32B 5/22* (2013.01); *B32B 5/32* (2013.01); *B32B 27/065* (2013.01); *B32B 27/08* (2013.01); *B32B 27/18* (2013.01); *B32B 27/20* (2013.01); *B32B 27/302* (2013.01); *B32B 27/304* (2013.01); *B32B 27/306* (2013.01); *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *B32B 27/40* (2013.01); *B32B 37/00* (2013.01); *B29C 47/003* (2013.01); *B29C 47/0026* (2013.01); *B29C 47/0054* (2013.01); *B29C 47/0057* (2013.01); *B29C 47/062* (2013.01); *B29C 47/067* (2013.01); *B29C 47/28* (2013.01); *B29C 49/04* (2013.01); *B29C 49/22* (2013.01); *B29L 2023/001* (2013.01); *B32B 37/153* (2013.01); *B32B 2266/0214* (2013.01); *B32B 2270/00* (2013.01); *B32B 2272/00* (2013.01); *B32B 2307/50* (2013.01); *B32B 2307/518* (2013.01); *B32B 2307/546* (2013.01); *B32B 2307/558* (2013.01); *B32B 2307/5825* (2013.01); *B32B 2307/72* (2013.01); *B32B 2307/7242* (2013.01); *B32B 2307/7265* (2013.01); *B32B 2439/70* (2013.01); *B32B 2439/80* (2013.01); *B32B 2597/00* (2013.01); *Y10T 428/1352* (2015.01); *Y10T 428/1393* (2015.01)

(56) References Cited

U.S. PATENT DOCUMENTS

| | | | |
|---|---|---|---|
| 3,565,985 A | | 2/1971 | Schrenk et al. |
| 3,884,606 A | | 5/1975 | Schrenk |
| 4,643,927 A | * | 2/1987 | Luecke ................ B32B 27/08 428/35.4 |
| 4,842,791 A | | 6/1989 | Gould et al. |
| 4,882,104 A | * | 11/1989 | Dobrowsky ............ B29C 47/92 264/209.1 |
| 5,094,788 A | | 3/1992 | Schrenk et al. |
| 5,094,793 A | | 3/1992 | Schrenk et al. |
| 5,202,074 A | | 4/1993 | Schrenk et al. |
| 5,215,691 A | | 6/1993 | Bland et al. |
| 5,269,995 A | | 12/1993 | Ramanathan et al. |
| 5,284,687 A | | 2/1994 | Blemberg |
| 5,456,979 A | | 10/1995 | Schirmer |
| 5,762,971 A | | 6/1998 | Schirmer |
| 6,517,657 B1 | | 2/2003 | Kuenzel et al. |
| 6,685,872 B2 | * | 2/2004 | Dooley ............... B29C 47/0023 264/171.26 |
| 8,562,885 B2 | | 10/2013 | Dooley et al. |
| 2003/0107151 A1 | | 6/2003 | Reilly et al. |
| 2003/0189758 A1 | | 10/2003 | Baer et al. |
| 2008/0157443 A1 | | 7/2008 | Hock |
| 2009/0263645 A1 | * | 10/2009 | Barger ................ B29C 44/04 428/316.6 |

FOREIGN PATENT DOCUMENTS

| | | |
|---|---|---|
| JP | 2004-34299 | 5/2004 |
| TW | 356447 B | 4/1999 |
| WO | 9703803 A1 | 2/1997 |
| WO | 02/06047 A2 | 1/2002 |
| WO | 2008/008875 A2 | 1/2008 |

OTHER PUBLICATIONS

Machine Translation of WO 97/03803, Motooka, et al., Feb. 1997.
Dooley, et al., Analyzing the Flow Through Dies Containing Different Channel Geometries, The Dow Chemical Company, Proceedings of the SPE 54th Annual Technical Conference & Exhibits, pp. 236-240, 1996.
Keeping-Up with Extrusion—Die Module Stacks Nano-Layers in Blow Film, http://www.ptonline.com/articles/kuw/33390.html, 2009 Gardner Publications, Inc., pp. 1.
Iuliano, et al., Improved Flexible Packaging Film Barrier Performance Via Layer Multiplication, Extrusion Dies Industries, LLC, Chippewa Falls, WI, USA, pp. 1-4.
Iuliano, Improved Flexible Packaging Film Barrier Performance Via Layer Multiplication, Extrusion Dies Industries, LLC, SPE Flexible Packaging Conference 2009, pp. 1-28.
Search Report and Written Opinion pertaining to International Application No. PCT/US2010/024653, dated Dec. 13, 2010.
Joseph Dooley, Jeff Robacki, Steve Jenkins, Patrick C. Lee, Robert Wrisley; Producing Microlayer Blown Film Structures Using Layer Multiplication and Unique Die Technology; Society of Plastic Engineers ANTEC 2011 Conference held May 1-5, 2011 in Boston, MA.
Translation of the Examination Report including Search Report of Patent Application No. 099105112.

\* cited by examiner

MULTILAYER STRUCTURES HAVING ANNULAR PROFILES

CROSS REFERENCE TO RELATED APPLICATIONS

This application is a divisional of U.S. patent application Ser. No. 12/706,323 filed Feb. 16, 2010 which claims benefit to Provisional Application Ser. No. 61/154,392 filed Feb. 21, 2009.

BACKGROUND OF THE INVENTION

1. Field of the Invention

The present invention relates to multilayer structures, and more particularly, to multilayer structures having annular profiles and methods and apparatus of making the same.

2. Discussion of the Related Art

The current multilayer film processing technologies are referred to as cast film and blown films. Cast film processes use a flat planar type of production process and are suited to produce flat plastic film and sheet that often have up to about 15% edge trim. Blown film process are known to provide greater flexibility in film or sheet width changes on the same line, achieve better economics in lower volume specialty applications where frequent product changeover is required and typically avoid the yield losses associated with edge trim.

Multilayer films are made by known layering processes typically using a uni-axial cast or planar sheet process or lamination. Coextruded cast film or sheet structures typically have 3 to 5 layers; however, cast film or sheet structures including hundreds of layers are known. For example, early multilayer processes and structures are shown in U.S. Pat. Nos. 3,565,985; 3,557,265; and 3,884,606. WO 2008/008875 discloses a related art method of forming multi-layered structures having many, for example fifty to several hundred, alternating layers of foam and film. The processes as shown, however, induce only substantially uni-axial orientation, namely, in the machine direction. This is disadvantageous since the resulting structures may possess unbalanced mechanical properties due to very unbalanced orientation. Subsequent orientation processes can be used (e.g. tenter-frame process) to achieve bi-axial orientation. These additional processes are elaborate and expensive and the desired degrees of orientation may be different than desired because it occurs with dimensional limitations and at a relatively cooler polymer temperature below the melting point of the highest melting point polymer in the multilayer film.

Multilayer structures having annular profiles with limited numbers of layers are used in numerous applications. These annularly shaped, tube-like structures include, for example, the "bubbles" in blown film processes, coatings on wires or cables, blow molded articles and the parisons or preforms used in their production, and pipe. Such articles typically contain 2 to 10 layers and have annular layers supplied by separate manifolds. Orientation process steps in the extrusion of annular profiles and products, such as the inflation of a blow molded article or the "bubble" in a blown film process, can very advantageously be utilized to provide biaxial orientation (sometime referred to as multi-axial orientation) that is known to provide polymer resin articles with very advantageous combinations of physical properties.

As well known in the art, blown film, blow molded and other annular shaped articles may be made by feeding a polymer melt flow into a distribution manifold of an annular die. Obtaining multiple layers generally requires a distribution manifold or mandrel to be designed and fabricated for each layer; e.g. a 6 layer annular structure would be made using a die containing 6 individual distribution manifolds, one for each layer. The design and fabrication of these multiple distribution manifolds to produce annular structures with a large numbers of layers is very difficult and limited in the number of annular layers that can be produced in a structure. See for example a sequential manifold layering technique for an annular die, as taught in Dooley, J. and Tung, H., *Co-extrusion*, Encyclopedia of Polymer Science and Technology, John Wiley & Sons, Inc., New York (2002).

Another method of making a multilayered structure having an annular profile includes using a spiral mandrel die. In a spiral mandrel/distribution manifold die, the polymer melt flow fed to the distribution manifold of the die flows through a manifold channel which is spirally cut from the entry to near the exit of the manifold, as described in Extrusion Dies, Design and Engineering Computations, Walter Michaeli, 1984, pages 146-147. The flow through the distribution manifold of the spiral die is not suitable for processing more than a single layer melt flow in a single distribution manifold since it would cause a multi-layered melt flow to become discontinuous and lose layer integrity.

U.S. Pat. Nos. 3,308,508, 5,762,971 and 6,413,595 disclose forming an annular multilayer structure in a so-called pancake die (also known as planar geometry). The pancake die includes multiple stacked planar or flat distribution manifolds. Each of several polymer melt flows is fed into a distribution manifold. The multilayered structure is formed by joining the several concentric melt flows after each melt flow exits its distribution manifold. If a large number of layers are desired, a large number of stacked manifolds are required. This can lead to a large pressure drop and extended residence times in the die. U.S. Pat. Nos. 5,762,971 and 6,413,595 disclose producing a final multilayer structure having a maximum of about 27 layers.

Using a spiral pancake die, multi-layered structures having up to 11 layers are known. However, these multi-layered structures are similarly made by stacking several spiral distribution manifolds on each other to form one annular die and combining the melt flow streams as they are exiting the entire annular die.

Another related art method of making a multilayered structure having an annular profile includes using an annular die, such as that described in U.S. Pat. No. 6,685,872. As disclosed, 3 layers are fed into one single distribution manifold of the annular die. The disclosed manifold design provides an annular multilayer structure which has a non-uniform circumference with a designed overlap section where the layer structure is overlapped in such a way that the overlapped area at least maintains the barrier properties of the layer structure in the non-overlapped area.

US 2008/0157443 describes a method and apparatus for making a parison. The apparatus has a mandrel housing with a side channel substantially transverse to the mandrel channel. The mandrel has an axially oriented notch in an exterior surface which is in fluid communication with two fluid channels that extend continuously downwardly around the mandrel to meet one another on the opposite side of the mandrel from the notch. The examples disclose structures having up to 17 layers, although it discusses composite streams having up to 100 layers.

However, there is always a need to produce annular multilayered structures having a larger number of layers; use a reduced number of distribution manifolds in a die; produce annular multilayered structures having improved combinations of physical and mechanical properties; and/or reduce the number of processing steps and increase flexibility in annular structure production equipment.

SUMMARY OF THE INVENTION

Accordingly, the present invention is directed to multilayer structures having annular profiles and methods and apparatus of making the same that substantially obviate one or more problems due to limitations and disadvantages of the related art. The various embodiments of the present invention can provide one or more of the following advantages.

An advantage of the present invention is to provide multilayer structures having annular profiles and having a high number of layers, which structures may be used to produce articles having a more uniform bi-axial orientation achieved in one step.

Another advantage of the present invention is to provide multilayer structures having annular profiles and having a larger number of and/or thinner layers than prior annular structures using a reduced number of distribution manifolds.

Another advantage of one embodiment of the present invention is to provide multilayer structures having annular profiles which may be used to produce blown film or blow molded articles in which the circumference of the structure avoids a conventional welding or overlapping area where structure properties will be undesirably or adversely affected. It is of course recognized that blown film products are not typically sold or used as annular structures, having been converted from an annular structure through known process steps to flat sheet products.

Another advantage of an alternative embodiment of the present invention is to provide multilayer film/foam structures having annular profiles having cross sections which contain foam layers and allowing down weighting while maintaining an acceptable balance of other physical properties.

Another advantage of an alternative embodiment of the present invention is to provide multilayer film structures having annular profiles having cross sections which contain inorganic filler layers in controlled quantities allowing tailoring of physical properties.

Another advantage of one embodiment of the present invention is to provide multilayer structures having annular profiles in which an increase in the number of layers is achieved while generally maintaining layer integrity for the majority of the layers.

In another alternative embodiment, another advantage of the present invention is to provide multilayer structures having annular profiles that are cost-effective for various applications and may have, or may be used to provide articles that have, at least one of: reduced density, improved barrier, improved layer uniformity, improved strength, improved insulation, improved toughness, improved tear resistance, improved puncture resistance, and improved stretch performance.

Additional features and advantages of the invention will be set forth in the description which follows, and in part will be apparent from the description, or may be learned by practice of the invention. The advantages of the invention will be realized and attained by the structure and method particularly pointed out in the written description and claims hereof as well as the appended figures.

To achieve these advantages and in accordance with the purpose of the invention, as embodied and broadly described herein, there are provided the following embodiments and preferred aspects of the present invention. One embodiment of the invention is a method of making an annular multilayer structure, comprising: providing a multilayer flow stream with at least four layers of thermoplastic resinous materials; feeding the multilayer flow stream to a distribution manifold of an annular die to form an annular multilayer flow stream; and removing the annular multilayer flow stream from the annular die to form the annular multilayer structure.

In another embodiment the inventive method comprises providing a multilayer flow stream with at least two layers of thermoplastic resinous materials; encapsulating the multilayer flow stream with at least one encapsulating layer to form an encapsulated multilayer flow stream having at least four layers of thermoplastic resinous material; feeding the encapsulated multilayer flow stream to a distribution manifold of an annular die to form an annular multilayer flow stream; and removing the annular multilayer flow stream from the annular die to form the annular multilayer structure. In further alternative embodiments, the distribution manifold has a cylindrical body, a tapered cylindrical body or a planar body.

In an alternative embodiment, the distribution manifold has a cross-head style geometry, wherein the multilayer flow stream is split into at least two flow streams, wherein two flow streams move in opposite directions around a circumference of the distribution manifold, preferably in one embodiment wherein the flow streams overlap in an area on the modified crosshead distribution manifold. In a further alternative aspect, the multilayer flow stream is fed into the single distribution manifold of the annular die through a circular tube flow channel having an arc shaped flow direction, wherein the arc has a radius of curvature larger than the diameter of the tube.

In accordance with another alternative embodiment of the invention, the method is further comprising providing at least one additional flow stream to the multilayer flow stream within the annular die using at least one additional distribution manifold and in such case, the additional flow stream may optionally be a multilayer flow stream. Other optional methods according to the invention further comprise adding a foaming agent or inorganic filler to at least one of the thermoplastic resinous materials before providing the multilayer flow stream.

In yet other alternative embodiment, the method according to the invention comprises placing the annular multilayer structure in the form of a parison inside a blow molding mold and inflating the annular multilayer structure to the shape of the mold or drawing the annular multilayer structure in a molten state to bi-axially orient the structure; and cooling the structure and optionally including re-heating the cooled structure to a temperature below the melting point of the highest melting point polymer in the structure; drawing the structure uni-axially or bi-axially to orient the structure; and subsequently cooling the structure. In further optional aspects, the multilayer flow stream includes greater than about 5 layers, and alternatively greater than about 25 layers.

In a further alternative aspect, the invention is an annular multilayer article having a uniform thickness, at least four layers and comprising overlapped and non-overlapped circumferential areas; wherein the layer structure of the non-overlapped area is doubled in the overlapped layer; with there also being an option that the article is comprising two external skin layers on either side of a microlayer component providing at least 15 layers. In further alternative embodiments, the multilayer blown film comprises a microlayer component having at least 27 layers.

In a further alternative embodiment, the invention is an apparatus comprising: a feedblock, with optional layer multiplier, that provides a multilayer flow stream of at least four layers to the manifold of an annular die; and an annular die having at least one distribution manifold that extrudes a multilayer flow stream. Optionally, in the apparatus according to the invention, the annular die manifold is a modified crosshead design splitting the flow stream and providing flow stream overlap area prior to extrusion of the multilayer flow stream and/or has a cylindrical body, a tapered cylindrical body or a planar body.

In a further alternative embodiment of the apparatus according to the invention, the apparatus as described above further comprises an encapsulation die between the feedblock (or optional layer multiplier) and the manifold that encapsulates the flow stream prior to entry into the manifold and/or further comprising an arc-shaped circular tube flow channel between the encapsulation die and the manifold and wherein a flow stream entry end of the circular tube flow channel is oriented at about a 90 degree angle with respect to a flow stream exit end of the circular tube flow channel.

In a preferred alternative embodiment of the present invention, blown multilayer films and processes according to the invention offer generally improved properties due to their annular die production, biaxial orientation (versus cast multilayer films) and/or increased number of layers. In general, improvements can be obtained in one or more of the tensile, toughness, stretch and/or barrier properties. Although biaxial orientation can also be obtained with cast films using tentering, this is an expensive, capital intensive unit operation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying figures, which are included to provide a further understanding of the invention and optional embodiments of the invention, are incorporated in and constitute a part of this specification, illustrate embodiments of the invention and together with the description serve to explain the principles of the invention. In the drawings.

DETAILED DESCRIPTION OF THE INVENTION

Figure 1:
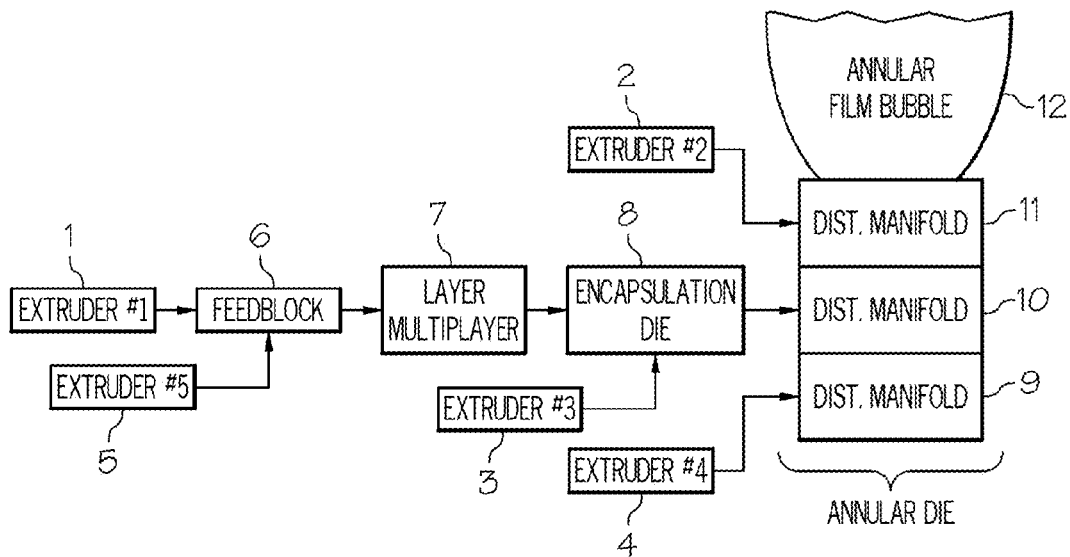
FIG. 1 is a schematic diagram illustrating a method of making a multilayer blown film for a multilayer film composite structure in accordance with an embodiment of the present invention.

Reference will now be made in detail to embodiments of the present invention, examples of which are disclosed in the specification and illustrated in the accompanying figures. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The numerical ranges in this disclosure include all values from and including the lower and the upper values, in increments of one unit, provided that there is a separation of at least two units between any lower value and any higher value. As an example, if a compositional, physical or other property, such as, for example, thickness and density reduction, etc., is greater than 10, it is intended that all individual values, such as 10, 11, 12, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated are to be considered to be expressly stated in this disclosure.

The method of making an annular multilayer structure in accordance with the present invention and as herein described below includes obtaining and utilizing a multilayer flow stream which is typically provided from a multilayer coextrusion process step, and optionally may be provided from a further layer multiplication process step. The claimed method optionally includes an encapsulation process step. The claimed method includes providing a multilayer flow stream with at least four layers of thermoplastic resinous materials to a distribution manifold in an annular die process step. Optionally, blown film process steps or blow molding process steps may be performed upon receiving the multilayer flow stream from the annular die exit.

Multilayer Flow Stream

As used herein, the term "flow stream" or "melt stream" with reference to a thermoplastic resinous material refers to the material, typically a polymer or polymeric material as described further below, being heat plastified (heated to a temperature at or above the melting or glass transition temperature of the material, i.e. a temperature where the material becomes sufficiently liquid like to flow in the equipment referred to in this embodiment), thermoplastically processable and flowable under sufficient pressure conditions. A flow stream can be provided by a number of known processing techniques. Preferably, a flow stream is provided from an extruder (i.e., by extrusion) optionally including a gear pump for flow uniformity, but it can also be provided as output from other heat plastification process steps using a gear pump. A multilayer flow stream with layers of thermoplastic resinous materials can be provided from two or more flow streams by known layering techniques including primarily well known coextrusion processes and, optionally, also by known layer multiplication techniques as discussed in further detail below.

Figure 2:
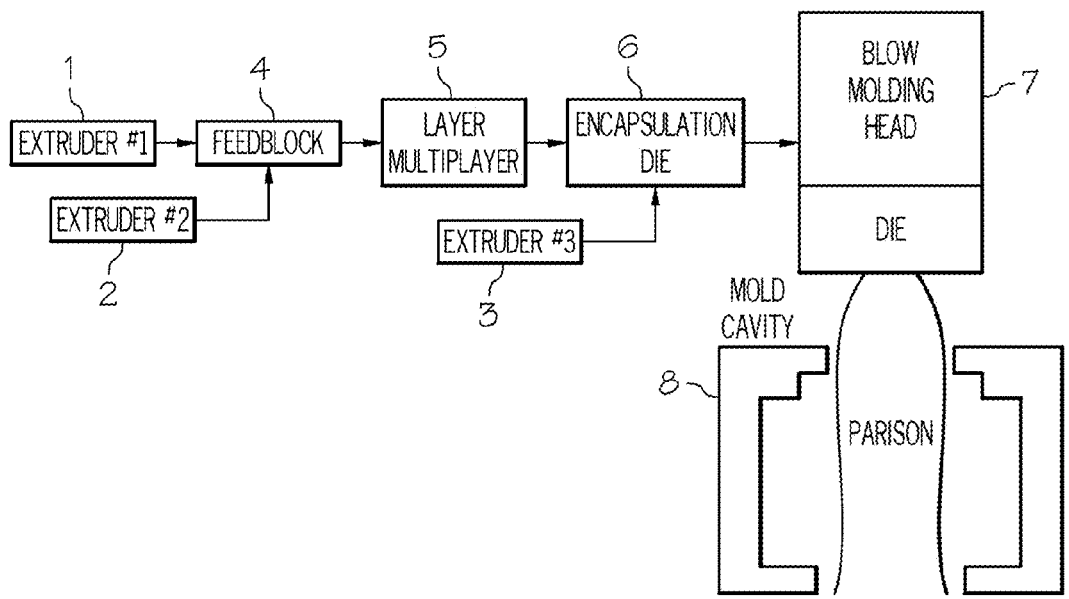
FIG. 2 is a schematic diagram illustrating a method of making a multilayer blow molded article from a multilayer film composite structure in accordance with an embodiment of the present invention.
Figure 5:
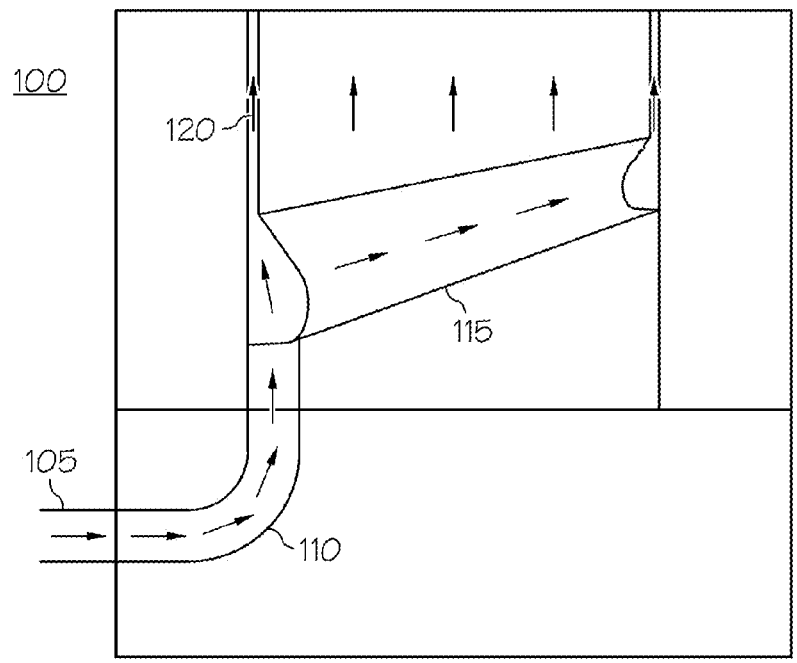
FIG. 5 is an illustration of a die having a large radius circular tube flow channel.

The multiple streams of thermoplastic resinous material may be coextruded through the use of known feedblock technology with two or more orifices arranged so that the resulting extrudate streams merge and weld together into a multilayer flow stream and continue through a flow channel toward the annular die. The multilayer flow stream may be, for example, a generally flat rectangular laminar stream, i.e., generally flat planar layers of about the same thickness and width as taught in WO 2008/008875; U.S. Pat. Nos. 3,565,985; 3,557,265; and 3,884,606, all of which are hereby incorporated by reference herein. Alternatively, 2 or more layers of the multilayer flow stream can be provided by encapsulation techniques such as shown by FIGS. 2 and 5 of U.S. Pat. No. 4,842,791 encapsulating with one or more generally circular or rectangular encapsulating layers stacked around a core or as shown by FIG. 8 of U.S. Pat. No. 6,685,872 with a generally circular, nonuniform encapsulating layer. As can be envisioned, an encapsulating layer has the effect of providing 2 outside layers to a multilayer flow stream when the flow stream is provided to and exits the annular die. U.S. Pat. Nos. 4,842,791 and 6,685,872 are hereby incorporated by reference herein.

In the present invention, a coextrusion process for providing a multilayer flow stream includes combining simultaneously or sequentially at least a first melt stream of thermoplastic resinous material and at least a second melt stream of thermoplastic resinous material and optionally additional streams. In simultaneous layering, the layers may be added or combined at the same point of the flow stream. Simultaneous layering may be performed, if, for example, the rheologies of the resinous materials are similar. In a sequential layering feedblock, the additional layers are added at different points along the flow stream. For example, the multilayer streams may be provided in a simultaneous combination of the streams by the feedblock processes as taught in U.S. Pat. Nos. 3,565,985; 3,557,265; 3,884,606. As taught in U.S. Pat. Nos. 3,557,265 and 3,884,606, their multilayer flow streams are also referred to as "interdigitated" or "interleaved."

A form of sequential stream addition is shown in U.S. Pat. Nos. 4,842,791 and 6,685,872, both of which are hereby incorporated by reference herein, where multilayer streams are provided by encapsulating an initial stream.

In one embodiment of the invention, as shown in FIG. 1, materials from single-screw extruders 1 and 5 are fed into a two layer A/B feedblock die 6 having at least two orifices. In another embodiment of the invention, as shown in FIG. 2, materials from single-screw extruders 1 and 2 are fed into a two layer A/B feedblock die 4 having at least two orifices.

Optional Layer Multiplication

Optionally, after the feedblock coextrusion process or an initial multilayer flow stream is otherwise provided, the multilayer flow stream may then be subjected to further layer multiplication process steps as are generally known in the art. See for example, U.S. Pat. Nos. 5,094,788 and 5,094,793, hereby incorporated herein by reference, teaching the formation of a multilayer flow stream by dividing a multilayer flow stream containing the thermoplastic resinous materials into first, second, and optionally other substreams, and combining the multiple substreams in a stacking fashion and compressing, thereby forming a multilayer flow stream. The multiple stacked substreams are fused to each other in an adjacent and a generally parallel relationship with one another in the multilayer flow stream. Within the multilayer flow stream, the multiple substreams exhibit uniformity, continuity, and thickness specifically calculated to provide a desired configuration having desired properties. The layer multiplication process may yield multilayer flow streams that contain many layers, such as several hundred layers.

For the multilayer flow streams used in the present invention, depending on factors such as desired properties, costs of manufacture, end use, etc., the streams contain at least 4 layers, preferably greater than about 4 layers, preferably greater than about 5 layers, preferably greater than about 8 layers, preferably greater than about 10 layers, preferably greater than about 11 layers, more preferably greater than about 20, more preferably greater than about 25, more preferably greater than about 27 layers, more preferably greater than about 30 layers, or greater than about 40 layers, or greater than about 50 layers, or greater than about 60 layers, or greater than about 70 layers, or greater than about 75 layers, or greater than about 80 layers, or greater than about 90 layers. Also, although the number of layers in the streams may be essentially limitless, the streams may be optimized to contain up to and including about 10,000 layers, preferably up to and including about 1,000 layers, more preferably up to and including about 500 layers, or up to and including about 400 layers, or up to and including about 300 layers, or up to and including about 250 layers, or up to and including about 200 layers, or up to and including about 175 layers, or up to and including about 150 layers, or up to and including about 125 layers, or up to and including about 100 layers. As known in the art, multilayer structures containing large numbers of layers as provided in one or more of the methods discussed above are often referred to as "microlayer" structures.

In one embodiment of the invention, as shown in FIG. 1, materials exiting the feedblock die 6 are fed into a series of optional layer multipliers 7. In another embodiment of the invention, as shown in FIG. 2, materials exiting the feedblock die 4 are fed into a series of optional layer multipliers 5.

Optional Encapsulation

Figure 4:
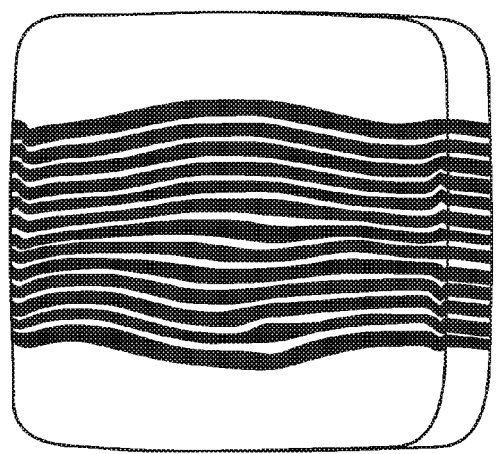
FIG. 4 is a photograph of the cross section of the segment of FIG. 3.

Optionally, if not already employed to provide at least two of the layers in the multilayer flow stream, encapsulation may then be employed by known methods as mentioned above to provide surface layers that protect an interior layer structure such as the very thin layers that are provided in a microlayer structure. See for example U.S. Pat. No. 5,269,995, which is hereby incorporated by reference herein. For example, in the present invention, the encapsulation die as shown in FIG. 4 and as described with reference to FIGS. 4, 5, 7 and 8 as disclosed in U.S. Pat. No. 6,685,872, herewith incorporated herein by reference, may be employed. Encapsulation with a relatively uniform encapsulating layer can also be provided according to the teachings of U.S. Pat. No. 4,842,791, incorporated by reference herein. As described in U.S. Pat. No. 6,685,872, a non-uniform encapsulating layer can be employed, especially if needed to provide the desired overlapping area using a modified crosshead annular die of the type shown therein. As taught therein, a non-uniform die gap can provide an appropriate thickness variation in the encapsulating layer. For example, in one embodiment of the invention the entire circumference or periphery of the multilayer flow stream may be encapsulated. For example, the ends of the multilayer composite stream may be fully encapsulated. If, for example, the multilayer flow stream includes two layers and is then encapsulated, the cross-section of encapsulated multilayer flow stream shows four layers.

Encapsulation layer(s) may advantageously improve the flow stability of the multilayer flow stream as it flows through the encapsulation die, the annular die, and any subsequent operations, such as shown with the encapsulation die described in U.S. Pat. No. 6,685,872. The encapsulation layer(s) may also have a functional purpose, for example, to improve weathering, UV stability, etc. In an alternative embodiment of the invention, the optional encapsulation layer effect may alternatively be provided for less than the entire circumference or periphery of the multilayer flow stream, including by the use of protective surface layers or a number of feedblock layers in excess of the number needed for obtaining the basic, desired annular structure properties. The encapsulation layer(s), for example, may be sacrificial layers that may be subsequently removed or damaged. As shown in FIG. 1, at least one encapsulation layer is incorporated onto the multilayer composite stream using optional extruder 3 in the optional encapsulation die 8. As shown in FIG. 2, optional encapsulation layers are incorporated onto the multilayer composite stream using optional extruder 3 in the optional encapsulation die 6.

Alternatively, only a portion of the circumference of the multilayer flow stream can be encapsulated, if desired. For example, the top and bottom of the stream can be coated with a layer, while leaving the sides exposed.

Optional Flow Channel

Optionally, in some alternative embodiments of the invention, after the formation of a generally rectangular or other non-circular multilayer stream, the stream has a relatively long distance to travel (for example, greater than about 5 to 10 times the flow diameter) or the flow direction needs to be changed (for example, from a horizontal extrusion plane to vertical blown film process steps). In such cases, a circular tube flow channel may be provided for the encapsulated multilayer flow stream to enter. The cross-sectional shape of the non-circular flow stream smoothly transitions to a circular shape which, when maintained in the flow stream, minimizes layer distortion that may be caused by secondary flows produced by elastic forces in the multilayer flow stream. If used, this circular tube flow channel may be formed into an arc with a relatively large radius of curvature relative to the tube diameter in order to change the flow direction of the multilayer flow stream, from horizontal to vertical, for example. The flow direction of the discharging end of the circular tube flow channel may be oriented at an angle of up to 90 degrees or greater with respect to the flow direction entering the circular tube flow channel. For changing the flow direction of the circular tube flow channel about 90 degrees, the ratio of the radius of the circular tube flow channel curvature (providing the change in flow direction) to the circular tube flow channel inner diameter is preferably greater than 1 to 1, preferably greater than 2 to 1, more preferably greater than 3 to 1, and more preferably greater than 5 to 1. The multilayer flow stream should be maintained in the circular tube cross section until it approaches the distribution manifold channel of an annular die, at which time the multilayer flow stream can smoothly transition from a circular geometry to an appropriate geometry for the distribution manifold channel of the annular die.

Figure 3:
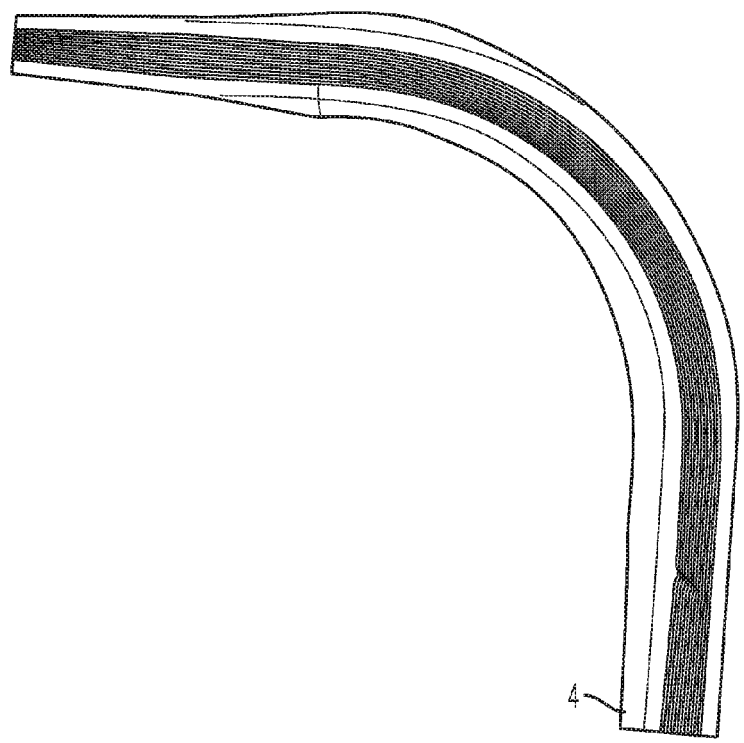
FIG. 3 is a photograph of a hardened multilayer flow stream from a large radius circular tube flow channel.

FIG. 3 shows a sample of a multilayer flow stream from a circular tube flow channel having a large radius of curvature relative to the tube diameter. The radius of curvature of the circular tube flow channel was 3.4, the inner diameter of the circular flow tube channel was 1.0, and the ratio of the two was 3.4. The multilayer flow stream included 27 alternating layers of polystyrene colored black and white for contrast. It was made using two 1.25 in. extruders running at 420° F. and a rate of 12 lb/hr. The process details and equipment are described below under Procedure. The extruders were stopped, and the multilayer flow stream was allowed to cool and harden in the circular flow tube channel. The circular flow tube channel was then removed, leaving the hardened multilayer material. The direction of flow was toward the position labeled 4 on the bottom right side.

The cross-sectional area of 4 was photographed as shown in FIG. 4 (which is after the transition from the circular geometry of the circular tube flow channel to a square geometry). FIG. 4 shows that the layers remained intact as they flowed around the curve toward the position labeled 4.

FIG. 5 shows a portion of a crosshead die 100. In a crosshead die, the flow direction must be changed from the horizontal extruder plane to the vertical die plane. The multilayer flow stream flows into the die in tube 105. It enters the die 100 through the circular flow tube channel 110 having a relatively large radius of curvature relative to the tube diameter. The flow is turned 90° from the incoming horizontal to vertically upward. The flow enters channel 115 leading around the die to the overlap area on the opposite side. The material flows upward from channel 115 through channel 120 and out of the die. One of skill in the art will recognize that the flow in the die could be up or down depending on the particular type of die.

Figure 6:
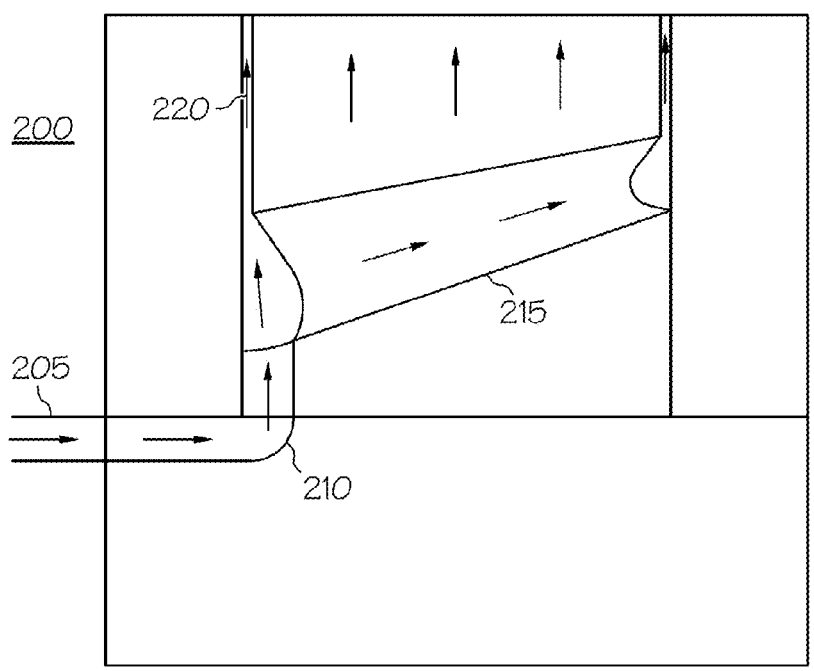
FIG. 6 is an illustration of a die having a small radius circular tube flow channel.

FIG. 6 shows a portion of a crosshead die 200 in which the radius of curvature is small. The flow stream enters the die from tube 205. The circular flow tube channel 210 has a small radius of curvature relative to the tube diameter, for example less than 1 to 1). The flow direction is turned 90° from horizontal to vertical. The flow enters channel 215 around the die, and upward from channel 215 through channel 220 and out the die.

The circular flow tube channel can be inside the die, as shown in FIG. 5, or outside of the die. If it is outside of the die, the flow tube channel changes the flow from horizontal to vertical before it enters the die, and the flow in the die is vertical to the channels around the die.

Therefore, as described above, the multilayer flow stream can be provided from a variety of different sources or steps including one or more of: a feedblock, an optional layer multiplier(s), an optional encapsulation die, or an optional circular tube flow channel.

Annular Die Process

The multilayer flow stream is provided to the annular die by being fed or delivered into a single distribution manifold of an annular die to form an annular multilayer flow stream by the time it exits the annular die. The distribution manifold distributes the multilayer flow stream to form an annular shape while maintaining the multilayer flow stream layer continuity. The single distribution manifold may have for example, a cylindrical body shape, a tapered cylindrical body shape or a planar body shape, all feeding to and exiting out the annular die.

More than one multilayer flow stream can be supplied to the annular die, but each multilayer flow stream has its own distribution manifold. For example, in FIG. 1, extruder 2 (or extruder 4, or both) could be replaced by an arrangement of one or more of extruders, feedblocks, layer multipliers, and encapsulation dies to obtain a second (or third) multilayer feed stream flowing into distribution manifold 11 (or distribution manifold 9).

It should be noted that in typical industry usage, the term "mandrel" often refers to or includes a "distribution manifold" and is used somewhat interchangeably with that term. As used herein relating to an annular die, the distribution manifold is the flow space or flow channel area that receives and transitions a flow stream over and around the surface of a generally cylindrical, planar or tapered cylindrical shaped mandrel unit that creates the annular profile flow stream that exits the annular. It is often created by and located between a center mandrel unit and an outer or upper shell or plate unit. The manifold distributes a polymer melt flow around the mandrel and forms the flow into the annular shape for the exit of the die.

If, for example, the manifold has a planar body, it lies between two horizontally oriented plate-type units and leads to a vertically oriented annular die. In this situation, the manifold will be oriented in a direction generally parallel and coplanar to the flow direction and layer interfaces within the multilayer flow stream. Advantageously, the planar manifold distributes and forms a multilayer flow stream into the annular shape for the exit of the die.

In one embodiment, the single distribution manifold may have a cross-head style geometry. In a distribution manifold having a cross-head style geometry, as shown for example in FIG. 9 of U.S. Pat. No. 6,685,872, an entering polymer melt flow stream splits at or near the entrance of the manifold into two flow streams that travel in generally opposing circumferential directions around a mandrel and also provides a very thin flow stream that flows toward the die exit along the mandrel in the axial direction. The split polymer melt flow streams then continue around the manifold in opposing directions to meet or join flows at or near the opposite side of the mandrel and form a generally annular flow stream that travels toward the annular die exit. In some crosshead-type annular dies, depending upon the die construction and/or material selection there may be a noticeable weld line at the joint or seam where the two flows meet. This may be undesirable is some applications and might possibly be advantageous in other applications.

In an alternative embodiment of the present invention, the single distribution manifold has a modified cross-head style geometry. The modified cross-head style geometry of the distribution manifold is described and shown in FIGS. 9, 10, 11, and 12 of U.S. Pat. No. 6,685,872, herewith incorporated by reference. This distribution manifold having the modified cross-head style geometry includes a body and a pair of manifold channels extending from an inlet of the distribution manifold around the body of the mandrel in opposing directions. Opposite ends of the manifold channels overlap each other and greatly diminish the appearance and effect of the weld line.

In a preferred modified cross-head annular die embodiment, the multilayer flow stream may split into at least two split flow streams, wherein each split flow stream travels in opposite directions in the pair of manifold channels around a circumference of the body of the distribution manifold. In another preferred embodiment, the split flow streams overlap each other but remain separated on an area on the distribution manifold where the opposite ends of the manifold channels overlap each other. Preferably, the overlap distance is optimized for the multilayer structure to provide desired article properties in the overlapped area.

As used herein, the terminology "desired article properties in the overlapped area" refers to several possible effects that may be provided by the modified crosshead die. For example, the overlapping manifold areas can be designed to provide generally consistent properties circumferentially around the annular structure, extending from the non-overlapped area into and through the overlapped area. For example, U.S. Pat. No. 6,685,872 discloses maintaining consistent barrier properties using this technique. Alternatively, since the overlapped area will have twice the number of layers with half the average layer thickness, it may intentionally exhibit a noticeable transition in terms of physical or optical properties. Having the noticeable transition could possibly be advantageously utilized in a number of ways in the annular structure. For example, it might be utilized to enable the consistent orientation or location of an annular article. It might provide an easy way to locate the overlapped area for removal if it is detrimental to the balance of the article circumference.

With a planar die ("pancake" die), the overlap can be formed by placing one end above the other so the two ends are at different heights (rather than at different radial distances as with the modified crosshead die).

Figure 7A:
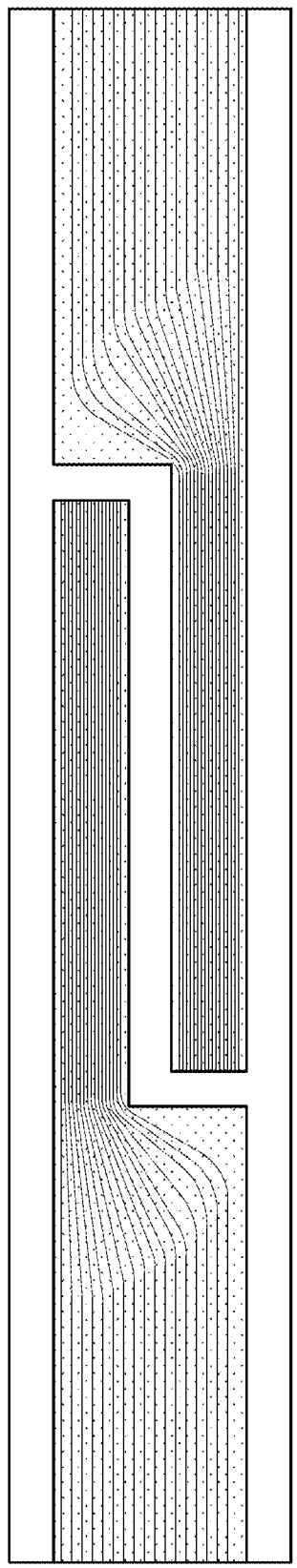
FIGS. 7A-B are illustrations of the overlap area of an annular multilayer structure.
Figure 7B:
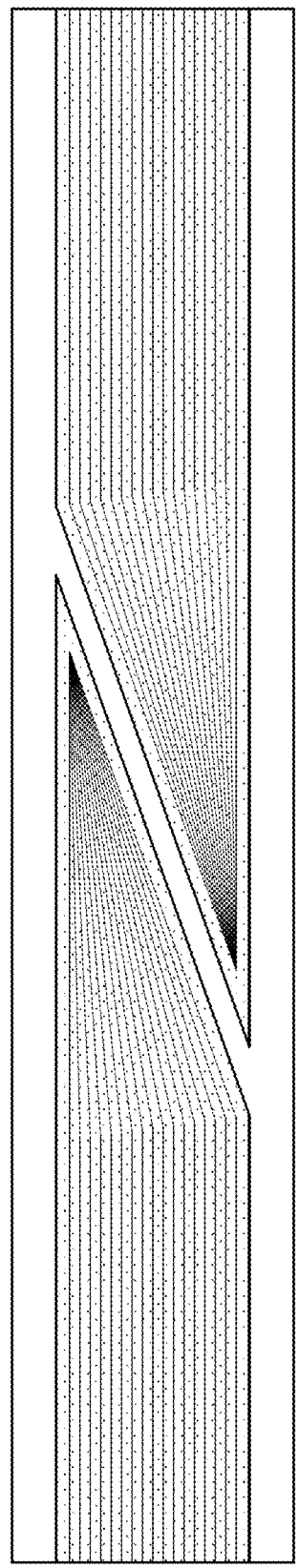
Figure 8A:
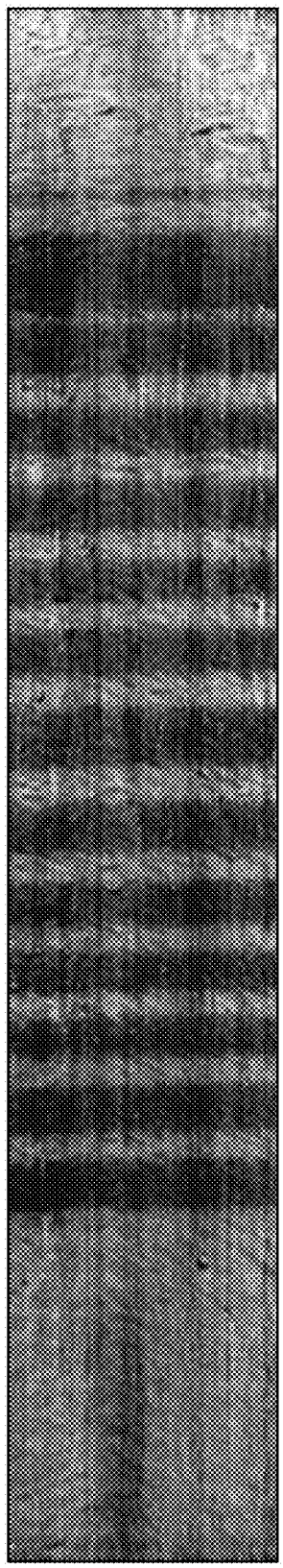
FIGS. 8A-B are atomic force microscope (AFM) photographs of the microlayers in the overlap and non-overlap areas of an annular multilayer structure.
Figure 8B:
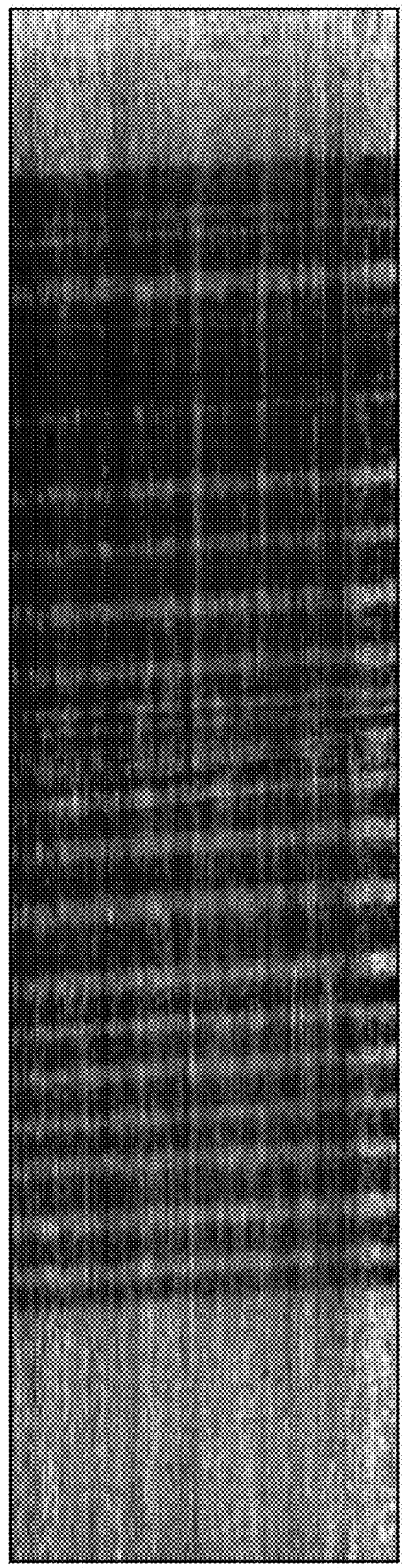

The overlap can be formed in a variety of ways, including, but not limited to, a step change or a sloped change, as shown in FIGS. 7A-B. It was surprisingly found that the layers remained intact in the overlap area, whether formed by the step change or the slope change. This is demonstrated in FIGS. 8A-B and 9A-B. FIGS. 8A-B are AFM images of microlayers in a blown film. The film had 27 microlayers of alternating low density polyethylene and Affinity™ polyolefin plastomer in the core. The film was made using a 1.25 in. and a 1.75 in. extruder running at a 50%/50% layer ratio. The core rate was about 12 lb/hr out of a total line rate of about 60 lb/hr. The process details and equipment are described below under Procedure. FIG. 8A shows the presence of intact microlayers in a blown film outside of the overlap area. FIG. 8B shows the overlap area for the film of FIG. 8A, which has twice as many layers in the same overall film thickness, and the layers remain intact.

Figure 9:
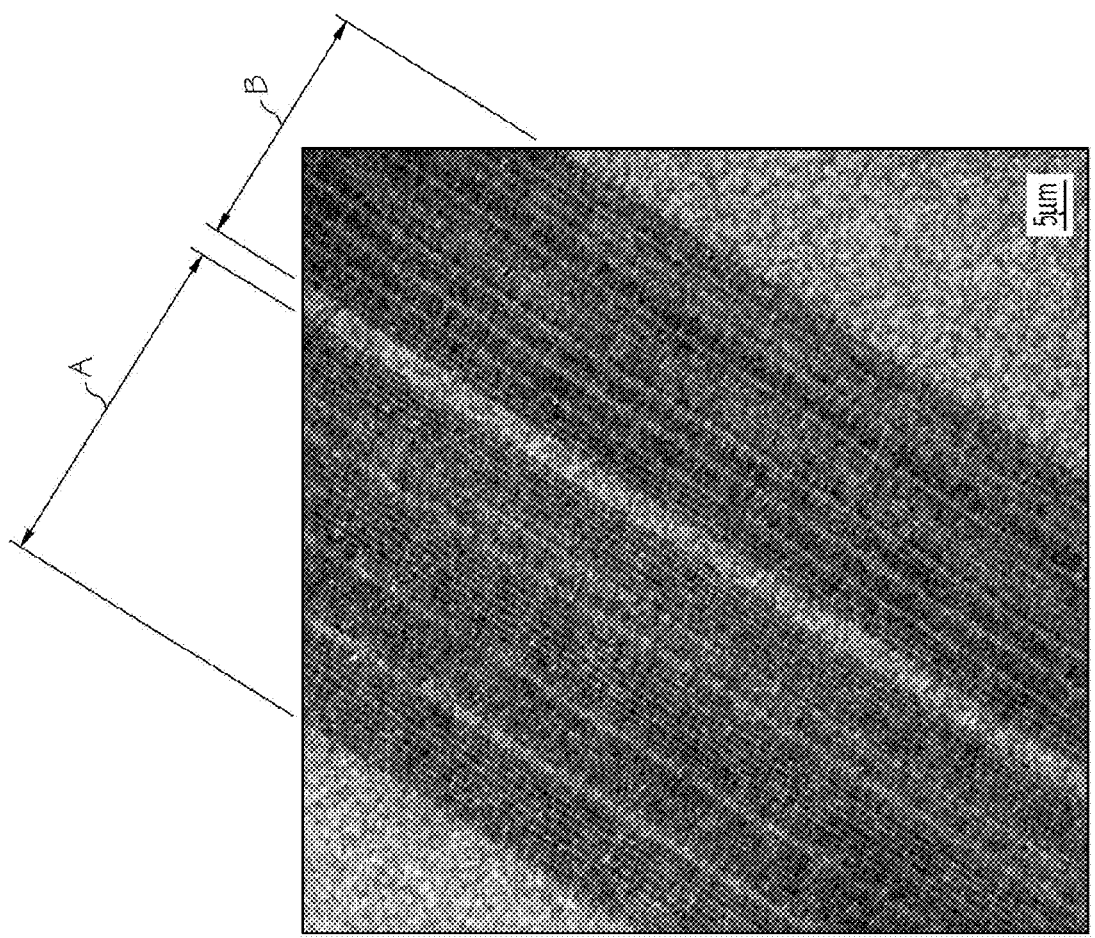
FIG. 9 is a (TEM) photograph of the microlayers in an overlap area of an annular multilayer structure.

FIG. 9 shows a TEM image of the microlayers in the overlap area of a blown film. Sections A and B each contain 100 microlayers of alternating low density polyethylene and Affinity™ polyolefin plastomer in the core. The film was made using a 1.25 in. and a 1.75 in. extruder running at a 50%/50% layer ratio. The core rate was about 12 lb/hr out of a total line rate of about 60 lb/hr. The process details and equipment are described below under Procedure. The layers are intact.

It should be noted that the barrier layers in the structures described in U.S. Pat. No. 6,685,872 are much thicker than the microlayers described here. It is easier to manipulate and maintain a few thicker layers intact compared to many thinner layers. In addition, it is easier to manipulate layers in a blow molding die which is smaller than a typical blown film die.

As shown in FIG. 1, the optionally encapsulated multilayer flow stream is fed into the distribution manifold 10 of an annular die. Optionally, additional flow streams may be produced by two extruders 2 and 4 and may be applied to the encapsulated multilayer flow stream by additional distribution manifolds 9 and 11 within the annular die. The additional flow streams may each be single layer or multilayer flow streams, including multilayer flow streams the same as or different from the primary encapsulated multilayer flow stream. Each of the distribution manifolds 9 and 11 may be a conventional manifold or may have the same modified cross-head style geometry of distribution manifold 10.

Then, the annular multilayer flow stream exits, i.e., is removed, from the annular die to form the annular multilayered structure.

The overlap of the split flow streams forms a flow stream where the ends of the flow stream are not exposed to the surface of a resulting structure. In one embodiment, by encapsulating and overlapping the multilayer flow stream, the occurrence of layered ends at the surface of the resulting annular multilayer structure may be eliminated and a conventional weld line is eliminated. The elimination of the layered ends and/or weld line beneficially improves both the mechanical and physical properties of the resulting annular multilayer structure. In at least one embodiment, the elimination of the layered ends beneficially improves the properties of the annular multilayer structure by maintaining at least consistent or improved properties in the overlap region as compared to the properties for the remaining circumference of the annular article.

Blown Film and/or Blow Molded Processes

After emerging from the annular die, the annular multilayer structure may be drawn while in the molten state or in a semi-solid state to uni-axially, bi-axially, or multi axially orient the structure. For example, inflation into a mold producing radial orientation, axial orientation, and different thicknesses may be referred to multi-axial orientation. Also, for example, uni-axial orientation may be employed to form wire and cable coatings, pipes, tubes, etc. In embodiments where an expanded thermoplastic resinous material is used, drawing achieves macroscopic cellular orientation of foamed cells within the expanded thermoplastic resinous material. The foamed cells may have different degrees of macro-cellular orientation.

Examples of drawing include, but are not limited to, (i) uni-axial drawing between an annular die and a drawing roll, (ii) three dimensional inflation, either for free surface blown film bubble blowing, or parison inflation into a mold (blow molding), and (iii) drawing a profile through a calibrator and/or quench tank. Typical drawing ratios, based on a uni-axial drawing process, range from about 2:1 to about 50:1, preferably from about 5:1 to about 30:1. Uniaxial "drawing ratios" are the ratio of the drawing speed to the speed at which the annular structure is exiting the die. Blow-up ratios, for bi-axial drawing processes, range from about 1.5:1 to 20:1, preferably from about 2:1 to 5:1. A blow-up ratio is the ratio of the diameter of the final annular product or article to the diameter of the article exiting the annular die. Then, the annular multilayer structure is stabilized by cooling, either assisted (e.g., air cooling, quenching, etc.) or unassisted, i.e., equilibrating to ambient room temperature.

As shown in FIG. 1, in one embodiment a blown film bubble 12 may be formed.

As shown in FIG. 2, in forming a blow molded article, the annular multilayer structure, a parison, may be placed in a blow molding mold and inflated to the shape of the mold to form an annular blow molded part. Exemplary blow molded articles may be formed using a typical blow molding head 7 and mold cavity 8. Blow-up ratios for blow-molded articles and blow molding processes range from about 2:1 to 10:1, preferably from about 3:1 to 5:1.

Optionally, a re-heating process may be performed on the annular multilayer structure. The structure is re-heated to a temperature below the melting point of the highest melting point polymer in the structure. Then, the structure is uni-axially or bi-axially drawn in a semi-molten state to orient the structure and subsequently cooled. The cooled structure may be used in, for example, shrink films.

Resulting Annular Multilayer Structure

The annular multilayer structure of the present invention, depending on factors such as desired properties, costs of manufacture, end use, etc., may contain, for example, at least about four layers, preferably greater than about 4 layers, preferably greater than about 5 layers, preferably greater than about 8 layers, preferably greater than about 10 layers, preferably greater than about 11 layers, more preferably greater than about 20, more preferably greater than about 25, more preferably greater than about 27 layers, more preferably greater than about 30 layers, or greater than about 40 layers, or greater than about 50 layers, or greater than about 60 layers, or greater than about 70 layers, or greater than about 75 layers, or greater than about 80 layers, or greater than about 90 layers. It should be recognized that in certain embodiments, in overlapping areas on the structure, the number of layers may be twice the number in other areas on the structure. Also, although the number of layers is theoretically nearly limitless, the streams may be optimized to contain up to and including about 10,000 layers, preferably up to and including about 1,000 layers, more preferably up to and including about 500 layers, or up to and including about 400 layers, or up to and including about 300 layers, or up to and including about 250 layers, or up to and including about 200 layers, or up to and including about 175 layers, or up to and including about 150 layers, or up to and including about 125 layers, or up to and including about 100 layers. As known in the art, multilayer structures containing large numbers of thin layers as provided in one or more of the methods discussed above are often referred to as "microlayer" structures.

In one embodiment of the invention, the resulting annular multilayer articles have a generally uniform thickness and comprise overlapped and non-overlapped circumferential areas; wherein the layer structure of the non-overlapped area is doubled in the overlapped area. As mentioned above, in certain embodiments where a modified crosshead die provides an overlapping area, in the overlapping areas on the structure, the number of layers may be twice the number in other areas on the structure.

As used herein, the term "generally uniform thickness" with reference to the annular circumference refers primarily to the fact that, in the embodiment where the annular multilayer articles have an overlapping area, the thickness of the overlapping area can be, is usually intended to be, and typically is, substantially the same thickness as the non-overlapped area. This is, of course, subject to minor, occasional and unintentional thickness differences. General thickness uniformity therefore means that preferably the structure thickness variation around the annular circumference, particularly between any overlapping and non-overlapping areas, if any, is generally less than 10%, preferably less than 5%, more preferably less than 2% most preferably less than 1%. In other embodiments of the invention, the die may intentionally provide a somewhat non-uniform thickness in the circumference of the annular structure.

As apparent from the general description of the invention here and in other sections, the invention provides the benefit of multiple annular layers and particularly annular microlayers in annular structures where the benefit of the multiple layers are provided and maintained around the circumference of the annular article. As discussed above, in situations where an overlapped area is provided, there can be areas where the layers themselves are not completely annularly continuous but, instead, have sufficient layer overlapping and/or redundancy to compensate for the layer thinness and ending point in the overlapping area. For example, the overlapping areas can be designed to provide generally consistent properties circumferentially around the annular structure, extending from the non-overlapped area into and through the overlapped area.

As known in the practice of multi-layering and microlayering, the average layer thickness is a function of, and can be calculated from, the final thickness of the micro/multi-layered structure or micro/multi-layer component in a structure and the number of layers obtained in that thickness. The preferred thicknesses for micro/multi-layer structures or for use as components in structures varies for different specific applications and will be discussed further below. The annular multilayer structure may be formed in a layered organization with a wide variety of repeating layer units or repeating patterns, such as repeating A/A, A/B, A/B/A, A/B/C, A/B/C/B/A, etc., by the selection and use of the appropriate multilayer feed stream and layer multiplier techniques according to various aspects and embodiments of the present invention. The thickness of the structure may vary depending on various factors, such as the thermoplastic resinous materials used, whether the materials are expanded or non-expanded, the desired properties of the structure, etc. Also, it should be noted that depending upon whether it is subsequently combined with additional layers from a multilayer annular die, the multi-/micro-layer structure can form all or part of the film structure. In optional alternative embodiments of the present invention, the annular multilayer structures according to the present invention are, in effect, a component of the main structure and are combined with additional layers through one or more additional die manifolds.

In one embodiment of the present invention where the multilayer annular structure is employed as all or part of a non-expanded film application, preferably a blown annular film structure, the structure would have a thickness of at least about 7 micrometers (0.3 mils), preferably at least about 10 micrometers (0.4 mils), more preferably at least about 15 micrometers (0.6 mils). For film applications, the film thickness is typically less than about 380 micrometers (15 mils), more preferably less than about 250 micrometers (10 mils), and more preferably less than about 125 micrometers (5 mil).

The use of the structures for other types of articles, such as blow-moldable parisons, extruded annular profile articles, e.g., pipe, particularly where expanded layers may be employed, may require thicknesses of at least about 1 millimeter (mm), preferably at least about 1.6 mm, and for pipe, up to as thick as about 152 millimeters (6 inch), preferably up to and including about 90 mm (3.5 inch). For blow-molded articles themselves, the wall thicknesses would be in the range of from about 1 mm to about 13 mm.

Optionally, provided either on the surface(s) of the annular multilayer structure (using additional annular die manifolds) or included in the annular multilayer structures as described above, there can be an external "skin". This can be, for example, one or more coextruded annular cap layers added to, or excess multiple external skin layers included on, one or both opposing sides of the annular multilayer structure. If present, the external skin layer(s) may comprise greater than zero and up to about 90% of a final product structure by thickness, or up to about 80% by thickness, or up to about 70% by thickness, or up to about 60% by thickness, or up to about 50% by thickness, or up to about 45 percent, or up to about 40 percent, or up to about 30% by thickness based on the total thickness of the structure. If used, an external skin would generally comprise at least about 1% by thickness, or at least about 5% by thickness, or at least about 10%, or at least about 20%, or at least about 30 percent, or at least about 40%, or at least about 45%, or at least about 50 percent, or at least about 60%, or at least about 70%, or at least about 75 percent, or at least about 80% by thickness.

Materials for Resinous Layers (and Optional Expanded Layers)

The layers in the multilayer structure can be made of the same material or two or more different materials.

Any thermoplastic resinous material which can be provided as a thermoplastic resinous flow stream and formed into a film may be employed as a flow stream in the process according to the present invention and as a layer in an article according to the present invention. Their selection will be determined by the intended use for the articles as well as any adhesion and/or processing requirements for other layer or flow stream selections. Preferred thermoplastic resinous materials include thermoplastic polymers. As used herein "polymer" means a polymeric compound prepared by polymerizing monomers, whether of the same or a different type. The generic term "polymer" embraces the terms "homopolymer," "copolymer," and "terpolymer," as well as "interpolymer."

"Interpolymer" means a polymer prepared by the polymerization of at least two different types of monomers. The generic term "interpolymer" includes the term "copolymer" (which is usually employed to refer to a polymer prepared from two different monomers), as well as the term "terpolymer" (which is usually employed to refer to a polymer prepared from three different types of monomers).

For example, thermoplastic polyolefin polymers, also referred to as polyolefins may be employed and are well-suited for the practice of the invention. "Polyolefin polymer" means a thermoplastic polymer derived from one or more olefins. The polyolefin polymer can bear one or more substituents, e.g., a functional group such as a carbonyl, sulfide, etc. For purposes of this invention, "olefins" include aliphatic and alicyclic compounds having one or more double bonds. Representative olefins include ethylene, propylene, 1-butene, 1-hexene, 1-octene, 4-methyl-1-pentene, butadiene, cyclohexene, dicyclopentadiene, and the like. These include, but are not limited to, polyethylene (PE), polypropylene (PP) and polybutylene (PB), and polyvinylchloride (PVC, both rigid and flexible).

Specific examples of useful olefinic polymers include ultra-low density polyethylene (ULDPE, e.g., ATTANE™ ethylene/1-octene polyethylene made by The Dow Chemical Company ("Dow") with a typical density between about 0.900 and 0.915 and a typical melt index ($I_2$) between about 0.5 and 10), linear low density polyethylene (LLDPE, e.g., DOWLEX™ ethylene/1-octene polyethylene made by Dow with a typical density between about 0.915 and 0.940 and a typical $I_2$ between about 0.5 and 30), homogeneously branched, linear ethylene/alpha-olefin copolymers (e.g., TAFMER® polymers by Mitsui Chemicals America, Inc. and EXACT™ polymers by ExxonMobil Chemical (ExxonMobil)), homogeneously branched, substantially linear ethylene/alpha-olefin polymers (e.g., AFFINITY™ and ENGAGE™ polymers made by Dow and described in U.S. Pat. Nos. 5,272,236, 5,278,272 and 5,380,810), catalytic linear statistical olefin copolymers (e.g., INFUSE™ polyethylene/olefin block polymers, particularly polyethylene/alpha-olefin block polymers and especially polyethylene/1-octene block polymers, made by Dow and described in WO 2005/090425, 2005/090426 and 2005/090427), and high pressure, free radical polymerized ethylene copolymers such as ethylene/vinyl acetate (EVA) and ethylene/acrylate and ethylene/methacrylate polymers (e.g., ELVAX® and ELVALOY® polymers, respectively, by E.I. Du Pont du Nemours & Co. (Du Pont)) and ethylene/acrylic and ethylene/methacrylic acid (e.g., PRIMACOR™ EAA polymers by Dow and NUCREL EMAA polymers by Du Pont), various polypropylene resins (e.g., INSPIRE® and VERSIFY® polypropylene resins made by Dow, VISTAMAXX® polypropylene resins made by ExxonMobil, and random copolymer polypropylene ("RCP")) and the cycloolefin or cyclic olefin polymers and copolymers ("COP's" and "COC's" respectively, COC's including for example Topas® brand polymers from Topas Advanced Polymers and COP's including for example, Zeonex® brand polymers from Zeon Chemicals). COP's and COC's are known and described, for example, in EP-A-0 407 870, EP-A-0 485 893, EP-A-0 503 422, and DE-A-40 36 264, incorporated herein by reference. As known, the COP and COC resins used are composed of one or more cycloolefins such as, for example, norbornene.

In an alternative embodiment of the present invention, one or more layer in the multilayer flow stream and in the annular multilayer structure is an LLDPE. Preferred LLDPE polymers are ethylene interpolymers of ethylene with at least one $C_3$-$C_{20}$ α-olefin. LLDPE copolymers of ethylene and a $C_3$-$C_{12}$ α-olefin are especially preferred. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. Preferred comonomers include propylene, 1-butene, 1-pentene, 1-hexene, 4-methyl-1-pentene, 1-heptene, and 1-octene, and 1-octene is especially preferred.

Other suitable thermoplastic resinous materials include the monovinylidene aromatic polymers which are prepared from one or more monovinylidene aromatic monomer. Representative monovinylidene aromatic monomers include styrene, toluene, α-methylstyrene, and the like. The monovinylidene aromatic polymer can bear one or more substituents, e.g., a functional group such as a carbonyl, sulfide, etc. Examples of monovinylidene aromatic polymers suitable for use as one or more layer in the multilayer flow stream and in the annular multilayer structure is of this invention include polystyrene, polystyrene-acrylonitrile (SAN), rubber-modified polystyrene acrylonitrile (ABS), and rubber-modified polystyrene (HIPS).

Other thermoplastic resinous materials suitable for use as one or more layer in the multilayer flow stream and in the annular multilayer structure of this invention include polyesters such as polyethylene terephthalate and polybutylene terephthalate; polycarbonate resins; poly-lactic acid; polyamides such as the nylon resins including nylon 6, nylon 66 and nylon MXD6; thermoplastic polyurethanes; ethylcellulose; poly(vinylchloride)-vinylidene chloride (PVDC); polyethylene vinyl alcohol (EVOH); methyl acrylate-vinylidene chloride copolymer; polymethylmethacrylate; and the like.

Preferably, the thermoplastic resinous materials for these layers are chosen to exhibit optimal properties in the resulting annular multilayer structure for the given application. In preferred embodiments, materials are selected based on properties desired in the final resulting structure. For example, if shrink properties are desired, materials yielding appropriate shrink properties, such as layers of polyolefin resins, may be selected. If barrier properties are desired, materials yielding appropriate barrier properties may be selected, such as PVDC or EVOH. If adhesive properties are desired, materials yielding appropriate adhesive bonding behavior between the other layers are chosen, such as EVA and EAA. For example, polyethylene resins having different densities may be employed to optimize stiffness and toughness. Desired properties in a final product may affect the choices for the materials for the multilayer structure. The materials may be chosen such that the rheology of the materials used complement and function with each other.

Further, additives may be incorporated as needed. Typical additives commonly incorporated into polymer compositions for various functionalities include catalysts or accelerators, surfactants, flame retardants, porosity control agents, antioxidants, colorants, pigments, fillers, and the like. Such additives will generally be incorporated in conventional amounts.

The thermoplastic resinous materials employed in one or more of the flow stream layers of the multilayer flow stream of the method of the present invention may optionally contain a blowing agent capable of providing expanded compositions. That is, the multiple streams of thermoplastic resinous materials in the multilayer flow stream may independently provide either expanded or non-expanded compositions. In an alternative embodiment of the present invention, at least one stream includes a blowing agent to provide an expanded composition. As generally well known in the art, expanded compositions include a blowing, expansion or foaming agent. Moreover, expanded thermoplastic resinous compositions can incorporate one or more compositions yielding desired functionalities such as a gas barrier (e.g. oxygen, carbon dioxide, etc.) composition (e.g., a film composition of ethylene vinyl alcohol copolymer or polyvinylidene chloride), a liquid or moisture barrier composition that substantially operates to prevent the liquid or moisture from crossing from one side of the layer to the other side of the layer, a chemical barrier composition that substantially operates to prevent chemicals or gas from crossing from one side of the layer to the other side of the layer, an oxygen scavenger formulation, etc.

The multilayer annular structure comprising an expanded or foamed layer may be rigid or flexible, and includes blown and cast films, tubing, wire coating, fibers, and other shapes with annular profiles.

The multilayer structures can include recycled materials, if desired. For example, in blow molding applications, the trim-offs from the blow molding operation can be used as a layer in the overall structure. This trim-off material includes all of the resins used in the multilayer structure. For complex parts, the recycling can amount up to 50% of the total structure. The recycled material could be used as one of more layers in the microlayer structure, it could be positioned between the microlayer structure and any skin layer, or it could be used as the skin layer. However, the use of the recycled material as skin layer may be less desirable due to the presence of the combination of different resins which may interfere with the content to be packed if it is on the inside or with post printing steps if it is on the outside.

Materials for Alternative Embodiments Including Expanded Resinous Layers

In alternative embodiments employing expanded resinous layers, any thermoplastic resinous material either filled or unfilled with inorganic material which can be blown or foamed may be employed for the layers of the present invention. These include and preferably are the thermoplastic resinous materials discussed above relating to the non-expanded layers, including their relative preferences. In one embodiment of the present invention, the same polymeric material can be employed for each purpose, e.g., polystyrene can be employed as both an expandable polymer resinous composition and as a non-expandable film-forming resinous composition in the same multilayer film composite structure.

Substantially any of the known foaming, blowing, or expansion agents may be incorporated into any one of or multiple thermoplastic resinous materials before the co-extrusion process. The blowing or expansion agents include, without limitation, physical blowing agents including gaseous materials and volatile liquids and chemical agents which decompose into a gas and other byproducts. Representative blowing or expansion agents include, without limitation, nitrogen, carbon dioxide, air, methyl chloride, ethyl chloride, pentane, isopentane, perfluoromethane, chlorotrifluoromethane, dichlorodifluoromethane, trichlorofluoromethane, perfluoroethane, 1-chloro-1,1-difluoroethane, chloropentafluoroethane, dichlorotetrafluoroethane, trichlorotrifluoroethane, perfluoropropane, chloroheptafluoropropane, dichlorohexafluoropropane, perfluorobutane, chlorononafluorobutane, perfluorocyclobutane, azodicarbonamide, azodiisobutyronitrile, benzenesulfonhydrazide, 4,4-oxybenzene sulfonyl-semicarbazide, p-toluene sulfonyl semicarbazide, barium azodicarboxylate, N,N' dimethyl-N,N'-dinitrosoterephthalamide, and trihydrazino triazine.

Chemical blowing agents include sodium bicarbonate, ammonium carbonate and ammonium hydrogencarbonate, citric acid or citrates, such as sodium citrate, sodium glutaminate, phthalic anhydride, benzoic acid, benzoates, such as aluminum benzoate, azodicarbonamide, azoisobutyronitrile and dinitropentamethylene. A preferred chemical blowing agent comprises mixtures of sodium bicarbonate and citric acid, including Foamazol 72 brand CBA which is a concentrate containing a mixture of citric acid and sodium bicarbonate in a pellet form commercially available from Bergen International.

The blowing agent is generally employed in amounts as may be needed to provide the desired amount of density reduction in the foam layer and in the final article. The term "density reduction" and the density reduction percentage mean the percentage the density is reduced in the foam layer and/or the final article by using chemical and/or physical blowing agent. For example, from a starting polymer (solid sheet) density of 1 g/cc, reduction of density to 0.9 g/cc is a 10% density reduction, to 0.85 g/cc is a 15% density reduction, etc. In order to have a combination of cost effectiveness and article performance, the foamed thermoplastic polymer layer desirably has a density reduction of at least about 10 weight percent ("wt %") based on starting thermoplastic polymer density, preferably at least about 15 wt %, most preferably at least about 20 wt %. In order to maintain final product performance properties such as thermoformability, the foamed thermoplastic polymer layer desirably has a density reduction of no more than about 90 weight percent ("wt %") based on starting thermoplastic polymer density, preferably up to about 80 wt %, more preferably up to about 70 wt %, most preferably up to about 60 wt %. In an alternative embodiment, these density reduction ranges and levels can be provided in the final multilayer structure by achieving an appropriate but somewhat greater degree of density reduction in the expanded layer as needed for the final product structure and desired density reduction.

The amount by weight of active chemical blowing agent incorporated into the foamable composition to provide a desired level of density reduction is dependent upon the efficiency and effectiveness of the particular blowing agent but it is generally added in amounts of at least about 0.016, preferably at least about 0.02 and more preferably at least about 0.16 weight percent based on the total weight of chemical blowing agent active ingredient, and up to amounts of about 0.8, preferably 0.4, and more preferably 0.36 weight percent based on the total weight of chemical blowing agent active ingredient and foamable polymer composition.

With regard to the use of gas-generating liquid or other physical blowing agent in a foam extrusion process, the added amount of physical blowing agent incorporated into the foamable composition depends upon the desired level of density reduction and the efficiency and effectiveness of the particular blowing agent but it has been found to be suitable to employ amounts of at least about 0.0001, preferably at least about 0.001, more preferably at least about 0.01 and more preferably at least about 0.063 weight percent based on the total weight of physical blowing agent and up to amounts of about 0.7 weight percent, preferably up to about 0.3, more preferably up to about 0.2 and most preferably up to about 0.128 weight percent based on the total weight of physical blowing agent.

Cell sizes and cell orientation for the expanded layers can be adjusted by known techniques to fall within desired or acceptable ranges as appropriate for the desired properties, and density reduction and expanded layer thicknesses. See for example U.S. Pat. No. 5,215,691 and WO 2008/008875 which disclose forming flat multi-layered structures having expanded layers, and are both incorporated herein by reference.

The blowing agent must be incorporated into the expanded thermoplastic resinous material melt stream under a pressure which is sufficient to inhibit foaming of the melt stream until the stream is expressed through the co-extrusion die. Generally, this pressure should be at least 500 psig and is preferably at least 1000 psig. Further, appropriate processing conditions are chosen to ensure that the blowing or expansion agent is sufficiently mixed and dissolved in the expandable thermoplastic resinous composition. For example, the melting temperature of the non-expanded thermoplastic material may be lower than the desired foaming temperature for the expandable thermoplastic material, as described in U.S. Pat. No. 5,215,691, incorporated herein by reference with regard to provision of the expandable and expanded layers.

Preferably, the thermoplastic resinous materials and blowing or foaming agents for these layers are chosen to exhibit optimal properties in the resulting multilayer structure for the given application. In preferred embodiments, thermoplastic resinous materials are selected based on properties desired in the final resulting structure as discussed above.

Preferably, in these alternative embodiments of the annular multilayer structure comprising and expanded layer, the layers alternate between expanded and non-expanded layers.

These foam layers including an expanded thermoplastic resinous material are typically to provide a thickness of at least about 10 micrometers, preferably at least about 50 micrometers and more preferably at least about 75 micrometers. The thickness may be less than about 1,000 micrometers, preferably less than about 500 micrometers and more preferably less than about 300 micrometers. In a preferred embodiment, the density of each foam layer is in the range of about 0.03 to about 0.8, preferably in the range of about 0.10 to about 0.5, grams per cubic centimeter (g/cc) as may be measured by ASTM D 3575-93 W-B. In an alternative embodiment, the density of the annular multilayer structure having been expanded layer may be in the range from about 0.05 to about 0.9, preferably in the range of about 0.15 to about 0.6 g/cc.

The multilayer annular die products and process according to the present invention can advantageously be applied in the area of barrier packaging such as processed meat packaging. The currently used packaging materials for hotdogs, luncheon meats, and other processed meats typically have from 7 to 11 layers. A suitable 7 layer blown film structure of this type (which can be subsequently thermoformed to form a bottom web) can be prepared to a structure thickness of about four mills as follows:

| Layer | % | mils |
|---|---|---|
| Nylon 6 | 12 | 0.5 |
| MAH-g-PE* | 26 | 1.0 |
| Nylon 6 | 5 | 0.2 |
| EVOH (38 mol % ethylene) | 10 | 0.4 |
| Nylon 6 | 5 | 0.2 |
| MAH-g-PE* | 8 | 0.3 |
| LLDPE | 34 | 1.3 |
|  | 100 | ~4.0 |

*Maleic anhydride grafted polyethylene.

As known in the industry, decreasing levels of mol % ethylene of a EVOH resin typically increases barrier properties at the expense of toughness and thermoformability. The forming web for these structures can range in thickness from 100-150 micrometers (4 to 6 mils). Problems with downgaging of these existing multilayer barrier structures include loss of barrier due to poor thermoformability and/or rupture of the EVOH, and balancing the barrier properties with toughness, optics, and film economics.

The microlayer blown film process of the current invention offers greater flexibility in achieving a larger number of layers (beyond 15 and preferably beyond 27 layers) to optimize the structure to improve at least one of the critical performance properties or a better balance of the key performance properties of toughness, barrier and thermoformability, and overall lower film cost or better film economics. For example, a downgaged multi-layer barrier structure is as follows:

| Layer | % | mils |
|---|---|---|
| Nylon 6 | 13 | 0.4 |
| Nylon tie | 23 | 0.7 |
| Nylon6/EVOH/Nylon 6 (microlayer) | 20 | 0.6 |
| Nylon tie | 10 | 0.3 |
| LLDPE | 34 | 1. |
|  | 100 | 3 |

The reference to microlayer in the above structure and those that follow refers to composite multilayer structures of the present invention whereby the structure is comprised of alternating layers of the disclosed polymer(s) having greater than 10 layers, more preferred greater than 15 layers, and most preferred greater than 27 layers. These structures may also include encapsulation of the microlayer composite structure as described in the present invention.

A portion of the film is made up of microlayers of Nylon6/EVOH/Nylon6 or alternating microlayers of Nylon6 and EVOH. This structure offers a desired combination of barrier, toughness, thermoformability, and film economics.

Alternately the Nylon/EVOH/Nylon center component of the original 4 mil film structure could be replaced with a microlayered center component of the same total volume percentage of material, with the only change being an increase in the total number of layers of each component, ultimately offering increased barrier/shelf life and toughness for the application.

Another alternative example for a microlayer barrier structure follows:

| Layer | % | mils |
|---|---|---|
| PP/Versify microlayer | 13 | 0.4 |
| Nylon tie | 23 | 0.7 |
| Nylon6/EVOH/Nylon 6 microlayer | 20 | 0.6 |
| Nylon tie | 10 | 0.3 |
| LLDPE | 34 | 1.0 |
|  | 100 | 3 |

*VERSIFY ™ is a propylene-ethylene elastomer or plastomer resin, available from The Dow Chemical Company.

Maleic anhydride (MAH) grafted ethylene copolymers can also be used as a tie layer to EVOH in place of the Nylon 6 in the structure. This structure could be made as a 3 or 4 mil film, depending on the toughness required, to optimize cost performance balance. The microlayers of polypropylene (PP) and Versify improve the formability and toughness versus a straight PP, to allow replacement of the more expensive Nylon.

The multilayer annular structure products and process according to an alternative embodiment of the present invention can also advantageously be applied to provide film barrier improvement. Nylon MXD6 barrier is known to improve via post fabrication orientation steps such as tentering or double-bubble processes. This high barrier is desirable when preparing long shelf life, retort packages, where the food is exposed to high humidity during the retort process. However, the additional orientation step via tentering adds significant cost. The annular microlayer process of the present invention, can provide very thin layers of MXD6 emerging from a single manifold and can be subsequently oriented further in a blown film process. This offers a cost effective barrier performance without the need to tenter (semi-solid orientation) the film. Blends of Nylon 6 or PET with nylon MXD6 can also be used in such microlayer structures, providing the oxygen barrier function in a final film.

In another alternative embodiment, the multilayer annular structure products and annular die process according to the present invention can advantageously be applied in the area of film structures for dry food packaging. Dry food packaging includes applications such as cereal, crackers, cookies, and other moisture sensitive products. These structures incorporate barrier materials for barrier to moisture, oxygen, and/or flavor and aroma. A typical multilayer package for moisture sensitive applications comprises a high-density polyethylene (HDPE) layer which can be used with Nylon or EVOH barrier layers, including tie layers and sealant layers, to provide the required barrier properties for the given application. Although the thickness of the barrier layer (e.g. EVOH or Nylon) can be increased to improve the barrier, it is generally not accepted as an economical solution due to the cost of the barrier resins or machinability issues that occur with thicker structures.

Thus, in alternative embodiments, the present invention can be very advantageously employed to provide microlayer barrier layer structure in annular multilayer structures, particularly in a blown film, to achieve a larger number of thinner barrier layers, particularly beyond about 15 and preferably beyond about 27 layers, to optimize the structure to improve at least one of the critical performance properties or obtain a better balance of the key performance properties, including but not limited to, toughness, barrier, and optics, potentially also at overall lower cost if electing to downgauge.

Typical film structures are described below:

| Layer | Weight percent |
|---|---|
| Sealant | 15 |
| HDPE | 85 |

| Layer | Weight percent |
|---|---|
| HDPE | 55 |
| Tie | 10 |
| NYLON | 10 |
| Tie | 10 |
| Sealant | 15 |

Microlayered structures can be made according to alternative embodiments of the present invention to achieve this balance using microlayers of the HDPE layer alone with a sealant layer, sealant layers typically being made from many known polymers including but not limited to LLDPE, PB, EVA, or propylene plastomers and elastomers. Though not bound by the theory, it has been postulated that a unique crystalline morphology that improves barrier property is produced in the very thin layers by microlayering. (*Science*, 223, pp 725-726, (2009)).

The proposed structures would be similar to those described above:

| Layer | Weight percent |
|---|---|
| Sealant | 15 |
| Microlayered HDPE | 85 |

| Layer | Weight percent |
|---|---|
| HDPE | 55 |
| Microlayered Tie/NYLON/Tie | 30 |
| Sealant | 15 |

Alternatively, the toughness could be enhanced by using a medium density polyethylene (MDPE) in place of the HDPE in the aforementioned examples. Also, to provide additional, better barrier and the ability to extend the shelf life of dry foods, since water absorption leads to a decrease in flavor appeal, Nylon could be replaced with EVOH in the above microlayered structure.

Another structure which can bring an improved combination of toughness and barrier incorporates two microlayered composite structures within the total film structure.

| Layer | Weight percent |
|---|---|
| Microlayered HDPE | 55 |
| Microlayered Tie/NYLON/Tie | 30 |
| Sealant | 15 |

Another alternative embodiment structure is achieved by eliminating tie layers and offers an improved cost/performance balance:

| Layer | Weight percent |
|---|---|
| Microlayer HDPE/NYLON | 85 |
| Sealant | 15 |

Currently, when a multilayer film incorporating a barrier layer such as EVOH, HDPE, Nylon MXD6 or Nylon is recycled, the resulting polymer blend is simply used as filler, as it adds no additional barrier enhancement to the structure. The recycled barrier film can be incorporated into the blown microlayer structure, having very thin layers, for further barrier enhancement. This can result in longer shelf life or allow improved economics via downgauging the barrier layer in the multilayer structure.

In another alternative embodiment, the multilayer annular die products and process according to the present invention can advantageously be applied in the area of nano clay barrier improvement. Researchers have tried to use nano clays or other inorganic fillers with polymers to improve barriers to oxygen and moisture. However, these technologies have not been cost effective and consistent. Microlayer blown films using nano-clays or other inorganic fillers such as talcs, in combination with suitable thermoplastic polymer(s), enable improvement in barrier to gas molecule transport and provide a balance of toughness and barrier properties. This enables improvements in silage wrap, heavy duty shipping sacks (HDSS), blister packaging, and other applications requiring high resistance to gas molecule transport.

In another alternative embodiment, the multilayer annular die products and process according to the present invention can advantageously be applied in the area of heavy duty shipping sacks (HDSS). HDSS are used to package items such as pet food, cement, mulch, fertilizer, and polymer pellets. Typically multi-layer structures based on linear low density polyethylene (LLDPE) or medium density polyethylene (MDPE) and polypropylene is used. Typical structures include a three-layer structure of LLDPE/PP/LLDPE (40/20/40) at 3 to 5 mil thickness. There remains a desire to improve the stiffness/toughness balance of the film. Microlayer structures enable desired improvements in stiffness/toughness balance and can further enable downgauging.

An example of a downgaged microlayer barrier HDSS structure comprising micro-layer core layer to provide the desired improvement in stiffness/toughness balance is as follows:

| Polymer | Volume % |
|---|---|
| LLDPE | 30 |
| LLDPE/PP microlayer | 40 |
| LLDPE | 30 |

Collation shrink films are typically composed of LDPE and LDPE/LLDPE blends and multi-layer structures. Performance targets include good optics (low haze), high shrinkage and high shrink tension for obtaining a tight package, good puncture resistance and a high modulus. For example, films on the order of 2.25 mil (62 microns) thick are used for shrink wrapping of 24 packs of water or carbonated beverage. A typical example co-extruded structure is LLDPE/LDPE/LLDPE (10/80/10 volume percent). The LLDPE skins are added to improve the toughness while the LDPE provides the shrink tension and optics. However, the balance in the above properties is difficult to achieve with a single resin or multi-layer structure.

In an alternative embodiment of the present invention, a microlayered core of LDPE, for example greater than 27 layers, could be provided to improve the toughness without compromising the optics or shrink tension. In another embodiment, a microlayered LDPE/LLDPE core, having greater than 27 layers, can be used. Alternatively, a microlayered (preferably greater than 27 layers) LDPE/LLDPE blend core can be used.

In an alternative embodiment of the present invention, the multilayer annular structures and processes for their production can be employed in production of blown stretch films. Stretch films are known to be used to wrap large pallets and are applied either via machines or via hand wrapping. Pallet wrap stretch film is applied on heavy loads typically by a wrapping machine equipped with stretching rollers. These stretch films are typically applied in a spiral, up and down wrapping process after having stretched in the 100-300% stretch range. Hand wrap is typically applied by hand and the stretch ratio is not higher that 100%. Goods wrapped are generally any industrial products shipped by pallet, i.e. chemicals, plastics, boxes, household appliances, etc. The key performance properties for these types of stretch films are high extension at break, puncture resistance, and elmendorf tear resistance. Although these mechanical properties can be used to gauge performance, ultimate performance in use is evaluated using a lab scale stretch wrapping device such as supplied by Highlight Industries. This method allows the determination of ultimate stretch, stretch force, unwind force, and pallet wrap to get cling and puncture. Films are typically on the order of about 20 micrometers (0.8 mils) in gauge. Additionally, the film usually has a cling layer for imparting cling. Typically, very low density polyethylene (VLDPE), EVA, LLDPE, LLDPE/LDPE blends, polyisobutylene (PIB), polyolefin plastomers and elastomers, and blends thereof are used in a cling layer. In addition, stretch films may also have a release layer with typical release layer materials including: MDPE, LLDPE/LDPE blends, as well as propylene-based polymers including random copolymers (RCP), and blends thereof.

A typical three layer blown stretch film structure (one-sided cling) is:
Polypropylene RCP (release layer)—0.1 mil
LLDPE (core layer)—0.6 mil
VLDPE (cling layer)—0.1 mil According to alternative embodiments of the present invention, otherwise similar annular, blown one-sided cling film structures for stretch wrap application are provided with core layers of microlayer LLDPE or microlayer LLDPE A/LLDPE B, where LLDPE A and LLDPE B are two different LLDPE resins. Microlayer core layer components using more than two LLDPEs can also be used in the above structure. The above microlayer composite film structures give desired combination of toughness, stretchability and holding force as compared to a typical multi-layer structure, and also allowing for improved film economics via downgaging. Alternatively, LLDPE A/LLDPE B could be replaced with various combinations of LLDPE, LDPE, HDPE, and propylene based polymers and blends thereof.

In addition, in an alternative embodiment of the present invention, the LLDPE core layer in a typical three layer stretch film with two-sided cling film properties could be replaced with a microlayer LLDPE core component to provide a structure as follows:

LLDPE/VLDPE blend (cling layer)—0.1 mil
Microlayer LLDPE (core layer)—0.6 mil
LLDPE/VLDPE blend (cling layer)—0.1 mil The above microlayer composite film structures give desired combinations of toughness, stretchability and holding force as compared to non-microlayer multi-layer structures, allowing for improved film economics via downgaging.

The present invention is illustrated in further detail by the following examples. The examples are for the purposes of illustration only, and are not to be construed as limiting the scope of the present invention.

Example #1

A film having a thickness of about 50 micrometers and containing 31 alternating layers of low density polyethylene is produced using a 178 mm diameter annular die on a blown film line. This film is produced by making a multilayer flow stream which is a stack of 27 layers and encapsulating that stack with another polyethylene layer and then feeding that structure into the central distribution manifold of a multilayer stacked annular die. The multilayer flow stream structure is formed in a conventional feedblock fed by a 51 mm extruder and a 19 mm extruder, for example, generally according to the feedblock process as shown in U.S. Pat. No. 3,557,265 then multiplied by a multiplier step as shown by U.S. Pat. No. 5,094,793.

These layers are then encapsulated with another polyethylene layer generally according to the process as shown in U.S. Pat. No. 6,685,872. The encapsulated flow stream has a generally rectangular cross sectional geometry, is transitioned to a circular transfer stream using a circular flow tube channel and delivered to the manifold of the planar annular die having a modified crosshead geometry to provide an extruded multilayer annular structure having an overlap area. The multilayer structure flows through the distribution manifold which forms an annular multilayer structure and provides layer overlap in an area of the extruded annular structure as shown in U.S. Pat. No. 6,685,872. As also shown in U.S. Pat. No. 6,685,872, two additional polyethylene skins are applied using separate distribution manifolds in the multilayer annular die. The annular multilayer flow stream exits the annular die as an annular multilayer structure and is inflated at a blowup ratio of 2:1. The bubble is collapsed and split into two film webs. Films were produced at rates of 14 to 32 kg/hr. This process is outlined in FIG. 1.

Example #2

A 500 micrometer annular film/foam structure containing 31 layers with alternating layers of low density polyethylene foam and film is produced on a 178 mm diameter die on a blown film line. This film is produced by making a multilayer flow stream in the form of a stack of 27 layers (13 expandable layers, 14 nonexpandable film layers) and encapsulating that stack with another polyethylene layer as described above for Example 1. The encapsulated flow stream is then delivered through a transfer line as described above for Example 1 to the annular die having a modified crosshead geometry and extruded as described above for Example 1. The multilayer structure flows through the center distribution manifold forming an annular microlayer structure with a layer overlap area and has polyethylene skins applied using separate distribution manifolds in the multilayer annular die. The annular multilayer flow stream exits the annular die and is inflated at a blowup ratio of 2:1. The bubble is collapsed and split into two film webs. Structures are produced at rates of 14 to 32 kg/hr. The structure has a resulting density of about 0.5 g/cc.

Example #3

A multilayer polyethylene blowmolded structure is prepared using a parison provided by a co-extrusion line that has two 19 mm diameter single screw extruders that feed two components through gear pumps into a feedblock generally according to U.S. Pat. No. 3,557,265 and series of layer multipliers similar in design to those described in U.S. Pat. No. 5,202,074 and U.S. Pat. No. 5,094,783. The multilayered polyethylene resin feedstream is encapsulated, generally according to the technique shown in U.S. Pat. No. 6,685,872 to provide a multilayer feed stream and forwarded into an annular crosshead die having a diameter of 38 mm and combining the edges of the split flow streams at the backside of the manifold (i.e., not providing an overlap area in the extruded annular structure). Overall extrusion rate is varied between approximately 9 kg/h to 18 kg/h. The annular extrudate is then captured in the cavity of a 350 ml cylindrical bottle mold, inflated, and cooled to form a part. These structures are formed on a 38 mm diameter die with a die lip gap of 1.52 mm. The part formation is completed in a 350 ml cylindrical mold with an inflation pressure of 0.4 MPa.

Example #4

A multilayer blow molded structure with alternating layers of polyethylene foam and film having different degrees of macro-cellular orientation are prepared from parisons prepared according to the process shown in Example 3 wherein one of the extruders provides a polyethylene component that contains 2 weight percent of an azodicarbonamide chemical foaming agent. Overall extrusion rate is varied between approximately 9 kg/h to 18 kg/h. The annular extrudate is then captured in the cavity of a 350 ml cylindrical bottle mold, inflated with an inflation pressure of 0.4 MPa, and cooled to form a part. These structures are formed on a 38 mm diameter die with a die lip gap of 1.52 mm. The overall density of the bottle is approximately 0.5 g/cc.
Procedure A film having a thickness of about 100 micrometers and containing 6 single layers of LLDPE skins and tie layers, and 27 alternating layers of EVOH and tie layer using a 178 mm diameter annular die on a blown film line. This film is produced by making a core multilayer flow stream which is a stack of 13 EVOH and 14 tie layers, encapsulating that stack with another tie layer, and then feeding that structure into the central distribution manifold of a multilayer stacked annular die. The multilayer flow stream structure is formed in a conventional feedblock fed by a 44.45 mm extruder and a 38.1 mm extruder, for example, generally according to the feedblock process, as shown in U.S. Pat. No. 3,557,265, then multiplied by a multiplier step, as shown by U.S. Pat. No. 5,094,793.

These layers are then encapsulated with another tie layer generally according to the process as shown in U.S. Pat. No. 6,685,872. The encapsulated flow stream has a generally rectangular cross sectional geometry, is transitioned to a circular transfer stream using a circular flow tube channel and delivered to the manifold of the planar annular die having a modified crosshead geometry to provide an extruded multilayer annular structure having an overlap area. The multilayer structure flows through the distribution manifold which forms an annular multilayer structure and provides layer overlap in an area of the extruded annular structure as shown in U.S. Pat. No. 6,685,872. As also shown in U.S. Pat. No. 6,685,872, two additional polyethylene skins are applied using separate distribution manifolds in the multilayer annular die. The annular multilayer flow stream exits the annular die as an annular multilayer structure and is inflated at a blowup ratio of approximately 1.7:1. The bubble is collapsed and split into two film webs. Films were produced at rates of 55 kg/hr. This process is outlined in FIG. 1.

The materials used in the following examples are shown in Table 1.

Comparative Example 5

The following comparative structure is made using a conventional 7 layer die at a blow-up ratio (BUR) of 1.7, a total line rate of 120 lb/hr, and the extrusion temperatures listed in Table 2.

| Resin | layer % of total film | # layers |
|---|---|---|
| DOWLEX ™ 2247G LLDPE | 30 | 1 |
| BYNEL 3861 | 10 | 1 |
| 50% Bynel 3861/50% Bynel 3860 | 2.5 | 1 |
| EVALCA H171B | 9 | 1 |
| 50% Bynel 3861/50% Bynel 3860 | 2.5 | 1 |
| BYNEL 3861 | 10 | 1 |
| DOWLEX ™ 2247G LLDPE | 20 | 1 |
| DOWLEX ™ 2247GLLDPE | 20 | 1 |
| DOWLEX ™ 2247G LLDPE | 16 | 1 |

This structure is 3.68 mils thick, with a oxygen transmission at 23 C and 80% RH of 0.238 cc/100 in$^2$/day/atm. This calculates to a permeability of 0.077 cc-mil/100 in$^2$/day/atm, which is comparable to literature values for H171B at 23 c and 80% RH.

Example 5

The following inventive example is produced on equipment as described in Comparative Example 5. It uses the same H171B as the comparative example, but the H171B is microlayered with the tie layer to make a core of 27 layers. The extrusion conditions are comparable to the control and listed in Table 2. The structure is as follows:

| | layer % of total film | # layers |
|---|---|---|
| 58% DOWLEX ™ 2045.11G/42% ELITE ™ 5230GELITE 5230 | 30 | 1 |
| 58% DOWLEX ™ 2045.11G/42% ELITE ™ 5230G | 10 | 1 |
| Lotryl EMA 29MA03 | 2.5 | 1 |
| 5% EVALCA H171B microlayered with 10% blend (50% bynel 3861/50% admer nf498Anf498A) | 15 | 27 |
| Lotryl EMA 29MA03 | 2.5 | 1 |
| 58% DOWLEX ™ 2045.11G/42% ELITE ™ 5230G ELITE 5230 | 20 | 1 |
| 58% DOWLEX ™ 2045.11G/42% ELITE ™ 5230G ELITE 5230 | 20 | 1 |

This structure has the H171B and the BYNEL/ADMER tie layer microlayered together at a 1:2 ratio to form a total core thickness of 15% of the structure, with a total of 5%

H171B in the film structure. This 3.36 mil film has an oxygen transmission at 23 C and 80% RH of 0.19 cc/100 in²/day/atm. This calculates to a permeability 0.031 cc-mil/100 in²/day/atm. This is 60% reduction in oxygen transmission from the control 7 layer structure.

Example 6

Another inventive example is made using the equipment described in Example 5 and the extrusion conditions of Table 2.

The microlayer structure is made using 10% H171B. This structure has the H171B and the BYNEL/ADMER tie layer microlayered together at a 1:2 ratio to form a total core thickness of 20% of the structure, with a total of 10% H171B in the film structure.

| | Layer % of total film | # layers |
|---|---|---|
| 58% DOWLEX ™ 2045.11G/42% ELITE ™ 5230GELITE 5230 | 30 | 1 |
| EVA 3170 | 10 | 1 |
| Lotryl EMA 29MA03 | 2.5 | 1 |
| 10% EVALCA H171B microlayered with 10% blend (50% bynel 3861/admer nf498A) | 20 | 27 |
| Lotryl EMA 29MA03 | 2.5 | 1 |
| Dupont EVA 3170 | 15 | 1 |
| 58% DOWLEX ™ 2045.11G/42% ELITE ™ 5230GELITE 5230 | 20 | 1 |

This microlayered film has a thickness of 3.59 mils, with an oxygen transmission at 23 C and 80% RH of 0.29 cc/100 in²/day/atm. This calculates to a permeability of 0.104 cc-mil/100 in²/day/atm.

These data show that Example 5, a 3.36 mil film with only 5% H171B, has a lower oxygen transmission than either Comparative Example 5 or this 10% H171B 27 layer core. This is due to the % H171B being divided into thinner layers, which optimized the crystallization and crystal size of the H171B, to reduce oxygen transmission.

Comparative Example #7

The same structure as made in Comparative Example 5 is tested for film properties.

This 3.7 mil multilayer film had a measured dart drop failure of 121 grams, or 32.7 gm·mil (ASTM D1709). This sample had a MD Elmendorf tear of 24 gm/mil and an TD Elmendorf tear of 28 gm/mil (ASTM D1922).

Example 7

The following inventive example is produced on equipment as described in Example 5 and used the same H171B as the comparative example and microlayered the tie layer with it to make a core of 27 layers. The sample is made at the conditions of Table 2. The structure is as follows:

| | Layer % of total film | # layers |
|---|---|---|
| DOWLEX ™ Dow 2247G LLDPE | 30 | 1 |
| DOWLEX ™ 2247G LLDPE | 10 | 1 |
| 50% BYNEL 3861/50% BYNEL 3860 | 2.5 | 1 |
| 5% EVALCA H171B microlayered with 10% bynel 3861 | 15 | 27 |
| 50% BYNEL 3861/50% BYNEL 3860 | 2.5 | 1 |
| DOWLEX ™ 2247G LLDPE2247G | 20 | 1 |
| DOWLEX ™ 2247G LLDPE2247G | 20 | 1 |

This structure has the H171B and the BYNEL tie layer, microlayered together at a 1:2 ratio to form a total core thickness of 15% of the structure with a total of 5% H171B. The measured dart drop for this 4.25 mil film is 259 or 60.9 gm/mil (ASTM D1709). This sample has a MD Elmendorf tear of 44.5 gm/mil and an TD Elmendorf tear of 50.4 gm/mil (ASTM D1922).

Another inventive microlayer structure is made on the equipment in Example 5 using a 10% H171B microlayer level. The sample is made using the conditions of Table 2.

| | Layer % of total film | # layers |
|---|---|---|
| DOWLEX ™ 2247G LLDPE | 30 | 1 |
| DOWLEX ™ 2247G LLDPE | 10 | 1 |
| 50% BYNEL 3861/50% BYNEL 3860 | 2.5 | 1 |
| 10% EVALCA H171B microlayered with 10% bynel 3861 | 20 | 27 |
| 50% BYNEL 3861/BYNEL 3860 | 2.5 | 1 |
| DOWLEX ™ 2247G LLDPE | 20 | 1 |
| DOWLEX ™ 2247G LLDPE | 15 | 1 |

This 3.94 mil film has a measured dart drop of 189 gms, or 48 gm/mil (ASTM D1709). This sample has a MD Elmendorf tear of 19.8 gm/mil and an TD Elmendorf tear of 16.8 gm/mil (ASTM D1922).

A third film is made on the equipment in Example 5 with the conditions of Table 2.

| | Layer % of total film | # layers |
|---|---|---|
| DOWLEX ™ 2247G LLDPE | 30 | 1 |
| DOWLEX ™ 2247G LLDPE | 10 | 1 |
| Lotryl 29MA03 | 2.5 | 1 |
| 5% EVALCA H171B microlayered with 10% 29MA03 | 15 | 27 |
| Lotryl EMA 29MA03 | 2.5 | 1 |
| DOWLEX ™ 2247G LLDPE | 20 | 1 |
| DOWLEX ™ 2247G LLDPE | 20 | 1 |

This 3.23 mil film has a measured dart drop of 370 gm or 114.5 gm/mil (ASTM D1709). This sample has a MD Elmendorf tear of 97 gm/mil and an TD Elmendorf tear of 259 gm/mil (ASTM D1922).

The two microlayered structures with 5% H171 divided into thin layers show that toughness can be increased through optimizing the individual layer thickness to control crystallization. The 10% EVOH, which would have thicker individual layers, showed a lower toughness vs the 5% levels.

TABLE 1

| Resin | Supplier | Melt Flow (190 C./2.16 kg) ASTM D1238 | Density (g/cc) ASTM D792 or ISO 1183 | % Comonomer |
|---|---|---|---|---|
| DOWLEX ™ 2247G | Dow Chemical | 2.0 | 0.917 | |

TABLE 1-continued

| Resin | Supplier | Melt Flow (190 C./ 2.16 kg) ASTM D1238 | Density (g/cc) ASTM D792 or ISO 1183 | % Comonomer |
|---|---|---|---|---|
| DOWLEX™ 2045.11G | Dow Chemical | 1.0 | 0.922 | |
| ELITE™ 5230 | Dow Chemical | 4.0 | 0.916 | |
| Bynel 3861 | Dupont | 2.0 | 0.95 | Anhydride grafted ethylene vinyl acetate |
| Bynel 3860 | Dupont | 5.7 | 0.96 | Anhydride grafted ethylene vinyl acetate |
| EVALCA H171B | Kuraray | 1.7 | 1.17 | Ethylene vinyl alcohol (38 mol % ethylene) |
| Lotryl EMA 29MA03 | Arkema | 2.0-3.5 | — | Ethylene methyl acrylate (27-31% MA) |
| Admer nf498A | Mitsui | 3.0 | 0.910 per ASMT D1505 | Modified polyolefin |
| Elvax 3170 | Dupont | 2.5 | 0.94 | Ethylene vinyl acetate (18% VA) |

TABLE 2

| | Extrusion Conditions | | | | | | |
|---|---|---|---|---|---|---|---|
| | Extruder | | | | | | |
| | 1 Skin | 2 Tie | 3 Barrier | 4 Tie | 5 Skin | 6 Skin | 7 encap- sulation |
| Size inches | 1.75 | 1.5 | 1.75 | 1.5 | 1.75 | 1.75 | 1.25 |
| Zone 1 | 380 | 380 | 380 | 380 | 380 | 380 | 350 |
| Zone 2 | 400 | 400 | 400 | 400 | 400 | 400 | 400 |
| Zone 3 | 420 | 420 | 420 | 420 | 420 | 420 | 420 |
| Zone 4 | 420 | | 420 | | 420 | 420 | |
| Die Adapter | 420 | 420 | 420 | 420 | 420 | 420 | 420 |
| Screen changer | 420 | 420 | 420 | 420 | 420 | 420 | 420 |
| flange | 420 | 420 | 420 | 420 | 420 | 420 | 420 |
| Die | 420 | 420 | 420 | 420 | 420 | 420 | 420 |

What is claimed is:

1. An annular multilayer article having a uniform thickness and comprising overlapped and non-overlapped circumferential areas;
the non-overlapped area having a microlayer portion with at least one additional layer on a first and second side of the microlayer portion;
the microlayer portion having at least 30 layers;
the microlayer portion having a microlayer structure; and
the layer structure in the overlapped area is doubled the non-overlapped area;
wherein the microlayer structure is maintained in the overlapped area.

2. An annular multilayer article according to claim 1 wherein the annular multilayer article is a multilayer blown film and wherein the at least one additional layer on the first and second side of the microlayer portion encapsulates the microlayer portion.

3. An annular multilayer article according to claim 1 wherein the annular multilayer article comprises at least one thermoplastic resinous material.

4. An annular multilayer article according to claim 3 wherein the thickness between the overlapped area and the non-overlapped area vary by less than 5%.

5. An annular multilayer article according to claim 3 wherein the thickness between the overlapped area and the non-overlapped area vary by less than 2%.

6. An annular multilayer article according to claim 3 wherein the annular multilayer article has a thickness between 7 micrometers and 380 micrometers.

7. An annular multilayer article according to claim 3 wherein the annular multilayer article has a thickness between 1 millimeter and 13 millimeters.

8. An annular multilayer article according to claim 3 wherein the thermoplastic resinous material is at least one of polyethylene, polypropylene, polybutylene, or polyvinylchloride.

9. An annular multilayer article according to claim 3 wherein at least one layer of the annular multilayer article comprises a linear low density polyethylene.

10. An annular multilayer article according to claim 3 wherein the thermoplastic resinous material is a monovinylidene aromatic polymer.

11. An annular multilayer article according to claim 3 wherein the thermoplastic resinous material is a polyester.

12. An annular multilayer article according to claim 3 wherein the annular multilayer article comprises a flame retardant.

13. An annular multilayer article according to claim 3 wherein the annular multilayer article comprises a colorant or pigment.

14. An annular multilayer article, the annular multilayer article comprising at least one thermoplastic resinous material, an overlapped area, and a non-overlapped area; wherein,
the annular multilayer article is a multilayer blown film having a uniform thickness with a variance between the overlapped area and the non-overlapped area of less than 5%;
the non-overlapped area has a microlayer portion with at least one additional layer on a first and second side of the microlayer portion which encapsulates the microlayer portion;
the microlayer portion has at least 30 layers;
the microlayer portion has a microlayer structure;
the layer structure of the non-overlapped area is doubled in the overlapped area; and
the microlayer structure is maintained in the overlapped area.

15. An annular multilayer article according to claim 14 wherein the annular multilayer article has a thickness between 7 micrometers and 380 micrometers.

16. An annular multilayer article according to claim 14 wherein the annular multilayer article has a thickness between 1 millimeter and 13 millimeters.

17. An annular multilayer article according to claim 14 wherein the thermoplastic resinous material is at least one of polyethylene, polypropylene, polybutylene, or polyvinylchloride.

18. An annular multilayer article according to claim 14 wherein at least one layer of the annular multilayer article comprises a linear low density polyethylene.

19. An annular multilayer article according to claim 14 wherein the thermoplastic resinous material is a monovinylidene aromatic polymer.

20. An annular multilayer article according to claim 14 wherein the thermoplastic resinous material is a polyester.

* * * * *